(12) United States Patent
Tochio

(10) Patent No.: US 9,391,694 B2
(45) Date of Patent: Jul. 12, 2016

(54) PROTECTION PATH PROVIDING METHOD AND TRANSMISSION DEVICE

(71) Applicant: FUJITSU LIMITED, Kawasaki-shi, Kanagawa (JP)

(72) Inventor: Yuji Tochio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/543,195

(22) Filed: Nov. 17, 2014

(65) Prior Publication Data
US 2015/0200723 A1    Jul. 16, 2015

(30) Foreign Application Priority Data

Jan. 16, 2014 (JP) ................................ 2014-006272

(51) Int. Cl.
*H04B 10/032* (2013.01)
*H04L 12/703* (2013.01)

(52) U.S. Cl.
CPC .............. *H04B 10/032* (2013.01); *H04L 45/28* (2013.01)

(58) Field of Classification Search
CPC .................................................. H04B 10/032
USPC ............................................................ 398/4
See application file for complete search history.

(56) References Cited

U.S. PATENT DOCUMENTS

| | | | | |
|---|---|---|---|---|
| 5,442,623 A * | 8/1995 | Wu | ........................ | H04J 3/085 370/224 |
| 6,973,267 B1 * | 12/2005 | Arecco | ................ | H04B 10/032 398/20 |
| 7,072,580 B2 * | 7/2006 | Arecco | ................ | H04J 14/022 398/20 |
| 7,206,508 B2 * | 4/2007 | Sharma | ............... | H04J 14/0283 398/30 |
| 7,302,176 B2 * | 11/2007 | Sakano | ................ | H04B 10/032 398/148 |
| 8,090,256 B2 * | 1/2012 | Reisslein | ............ | H04J 14/0227 398/17 |
| 8,705,345 B2 * | 4/2014 | Kamal | ...................... | H04J 3/14 370/217 |

(Continued)

FOREIGN PATENT DOCUMENTS

| | | |
|---|---|---|
| JP | 2007-49573 | 2/2007 |
| JP | 2007-110366 | 4/2007 |

*Primary Examiner* — David Payne
*Assistant Examiner* — Omar S Ismail
(74) *Attorney, Agent, or Firm* — Fujitsu Patent Center

(57) ABSTRACT

A protection path providing method is used in a network that includes a shared section in which a first protection path corresponding to a first work path to transmit a first traffic and a second protection path corresponding to a second work path to transmit a second traffic are configured. The method includes: transmitting a message that includes information indicating a transmission rate of the first work path via a logical ring, the logical ring being formed using a route for which the first work path is configured and a route for which the first protection path is configured, when a failure is detected in the first work path; and controlling a switch circuit installed in a transmission device provided at an end of the shared section in accordance with the message in such a manner as to transmit the first traffic via the shared section.

8 Claims, 26 Drawing Sheets

(56) References Cited

U.S. PATENT DOCUMENTS

| | | | |
|---|---|---|---|
| 2001/0021049 A1* | 9/2001 | De Girolamo | H04J 14/0283 398/79 |
| 2001/0026384 A1* | 10/2001 | Sakano | H04B 10/032 398/79 |
| 2002/0003639 A1* | 1/2002 | Arecco | H04J 14/022 398/59 |
| 2002/0080445 A1* | 6/2002 | Falkenstein | H04J 3/08 398/2 |
| 2002/0181037 A1* | 12/2002 | Lauder | H04B 10/032 398/3 |
| 2003/0163593 A1* | 8/2003 | Knightly | H04L 12/42 709/251 |
| 2004/0042796 A1* | 3/2004 | Con-Carolis | H04J 14/0227 398/83 |
| 2004/0202467 A1* | 10/2004 | Luft | H04B 10/032 398/4 |
| 2004/0213564 A1* | 10/2004 | Sakano | H04B 10/032 398/12 |
| 2007/0036073 A1 | 2/2007 | Yamada et al. | |
| 2007/0086330 A1 | 4/2007 | Suzuki et al. | |
| 2011/0135305 A1* | 6/2011 | Barnard | H04B 10/572 398/49 |
| 2012/0250739 A1* | 10/2012 | Nagaki | H04J 3/085 375/219 |
| 2014/0233939 A1* | 8/2014 | Gruman | H04L 43/0811 398/5 |

* cited by examiner

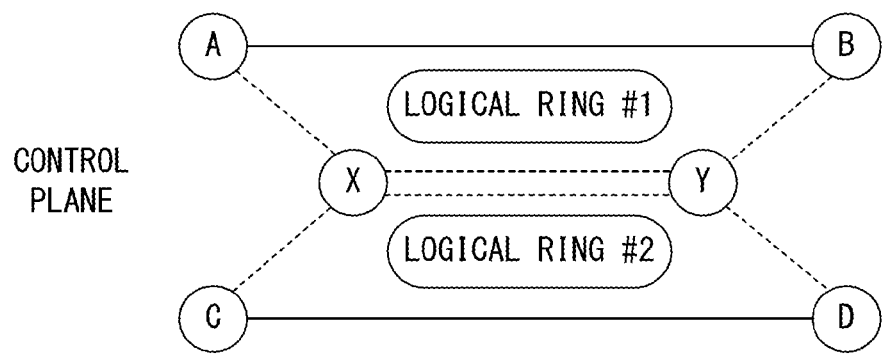
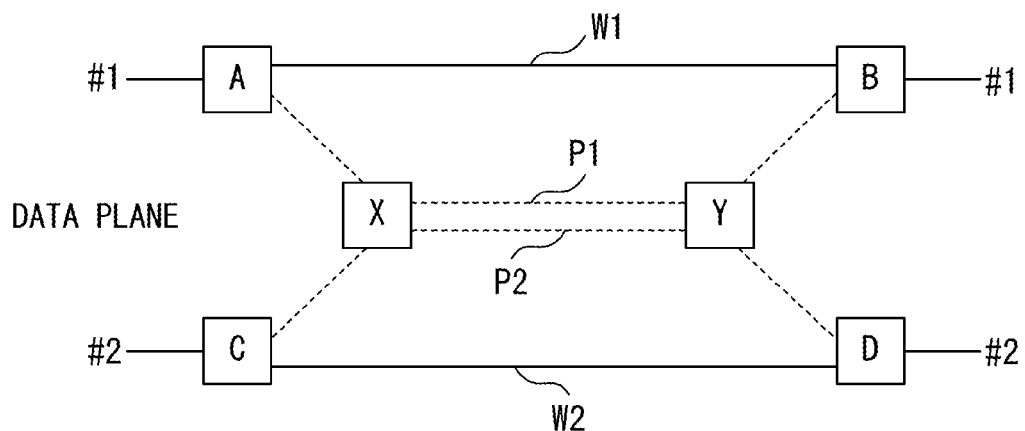
F I G. 2

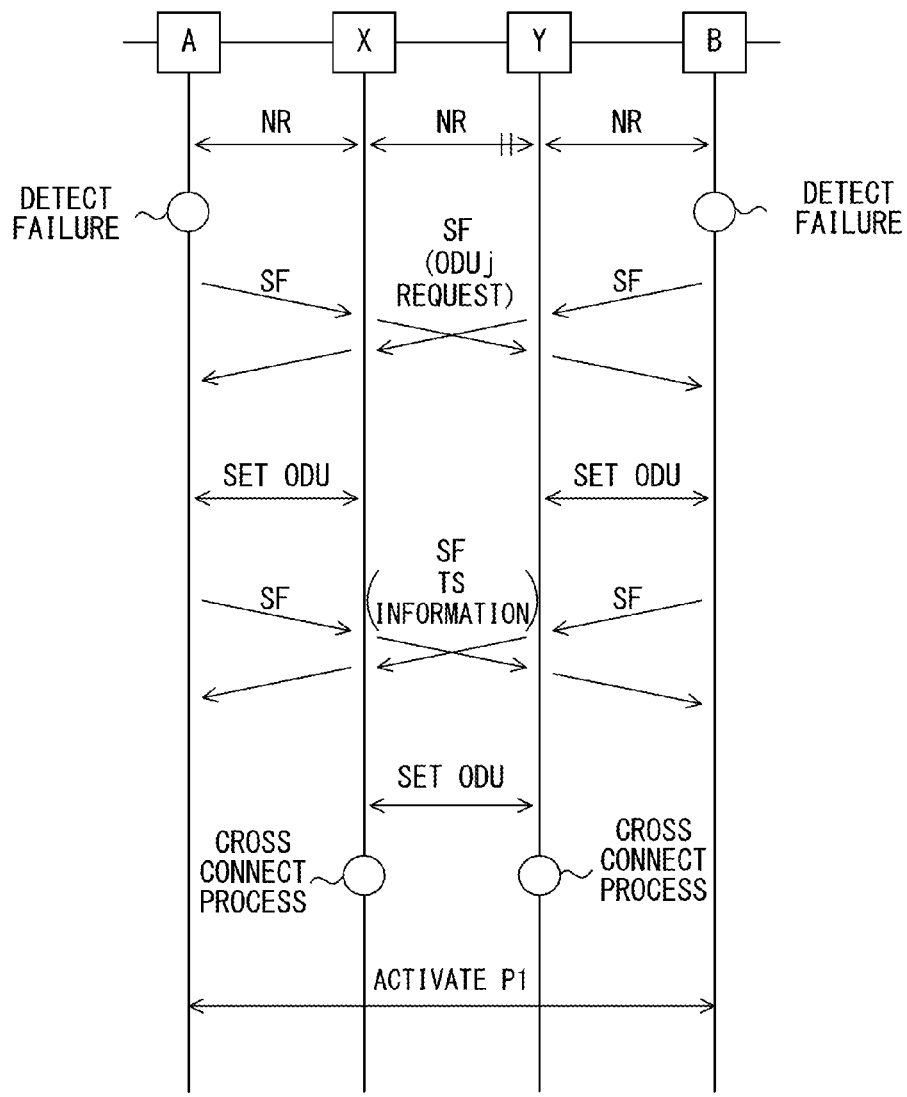
F I G. 5

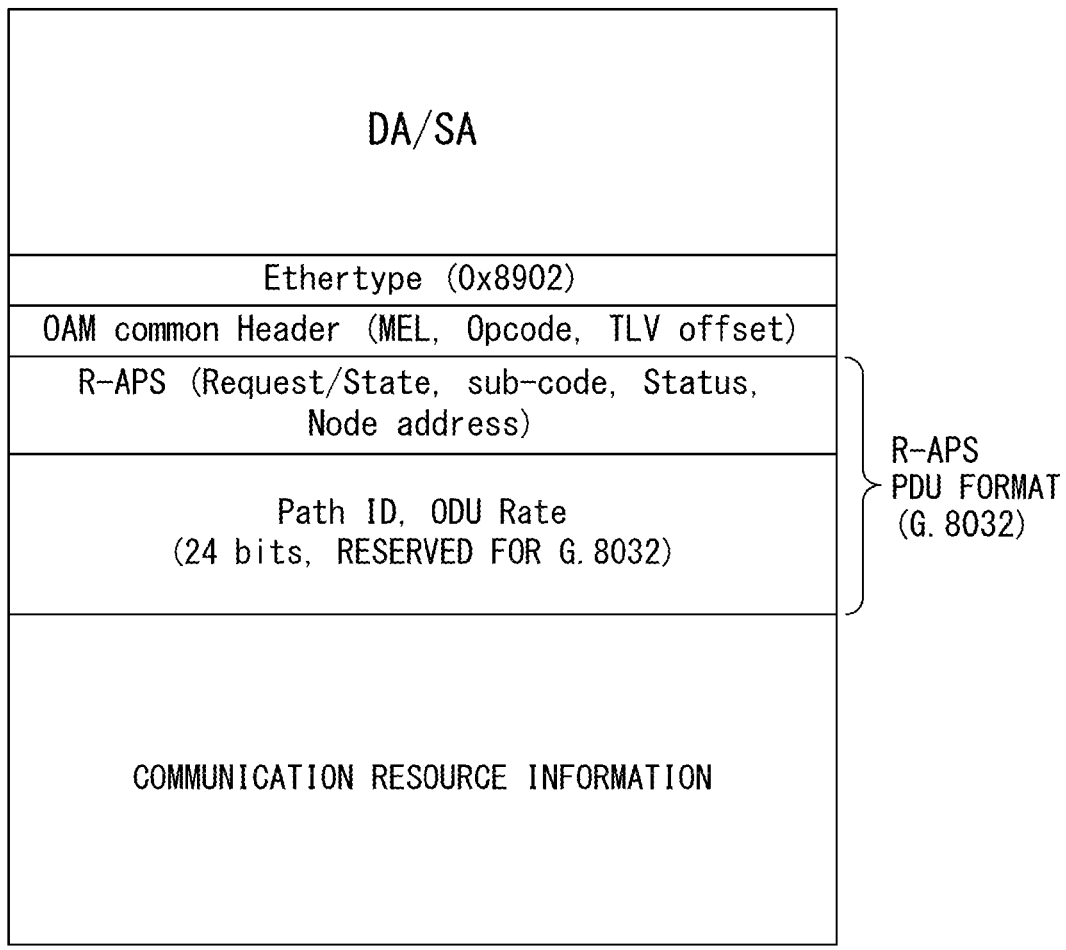
F I G. 6

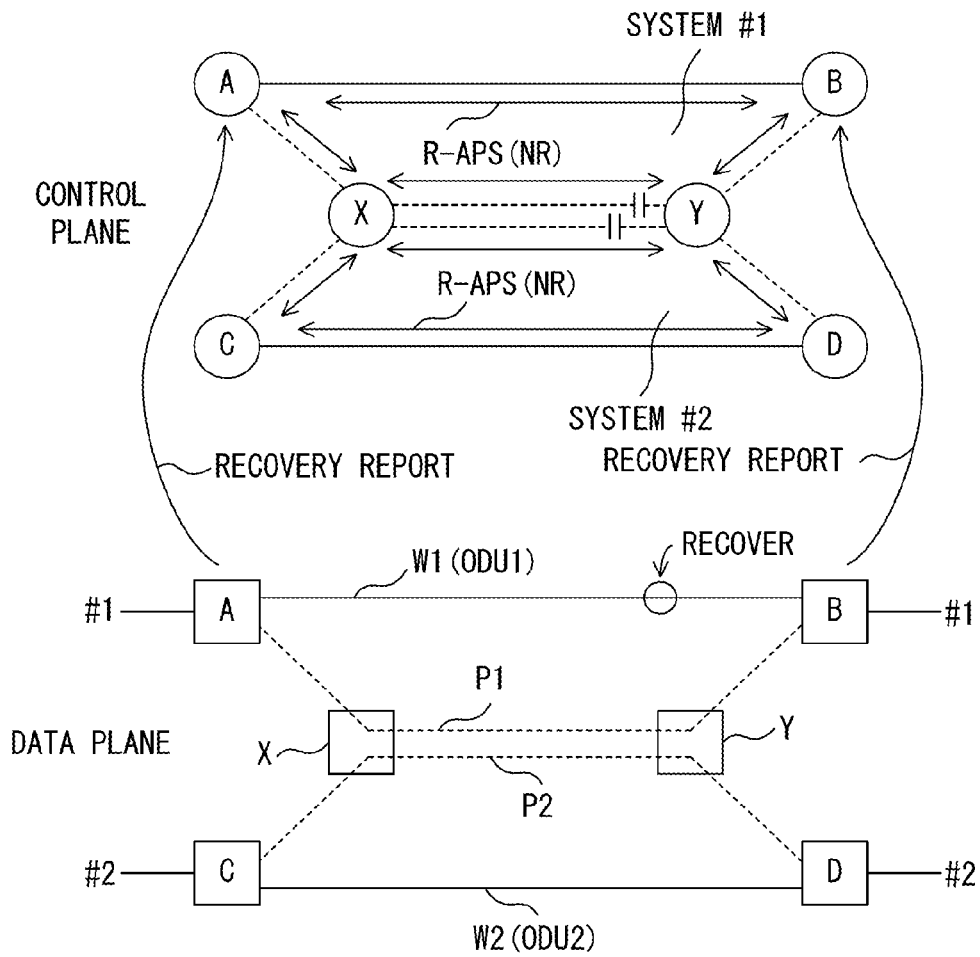
F I G. 7

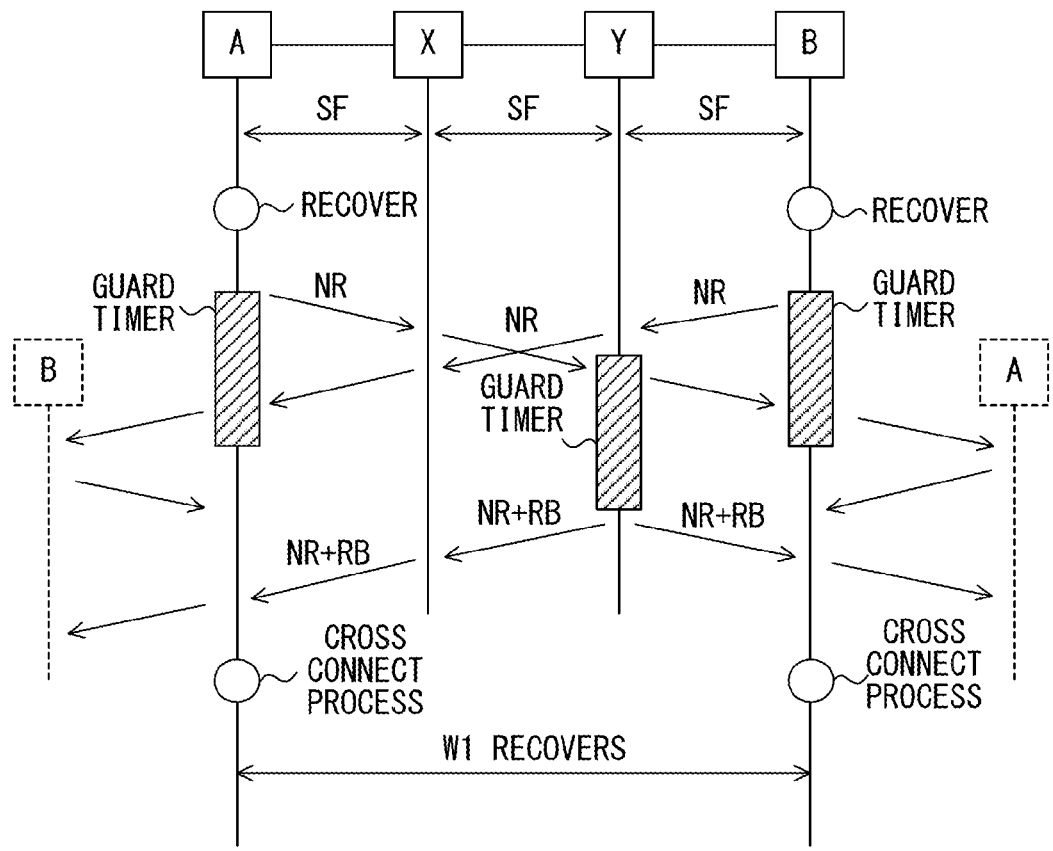
F I G. 8

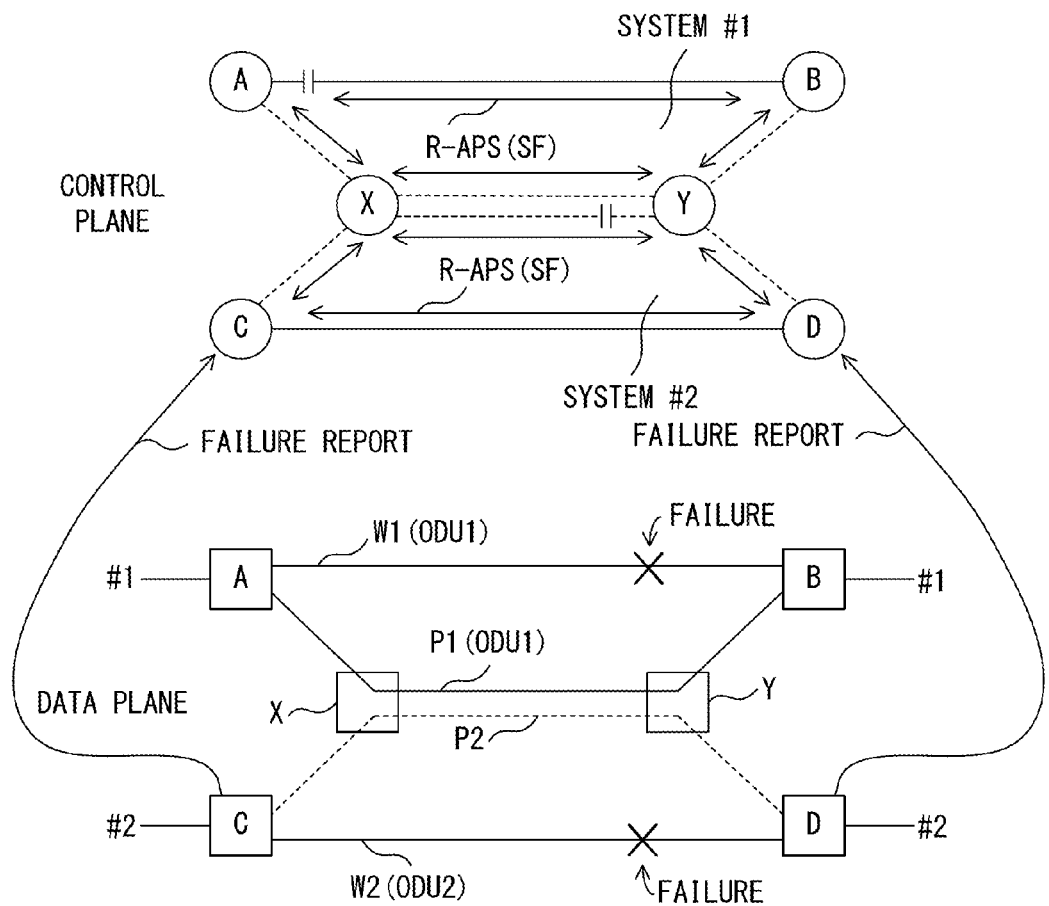
F I G. 9

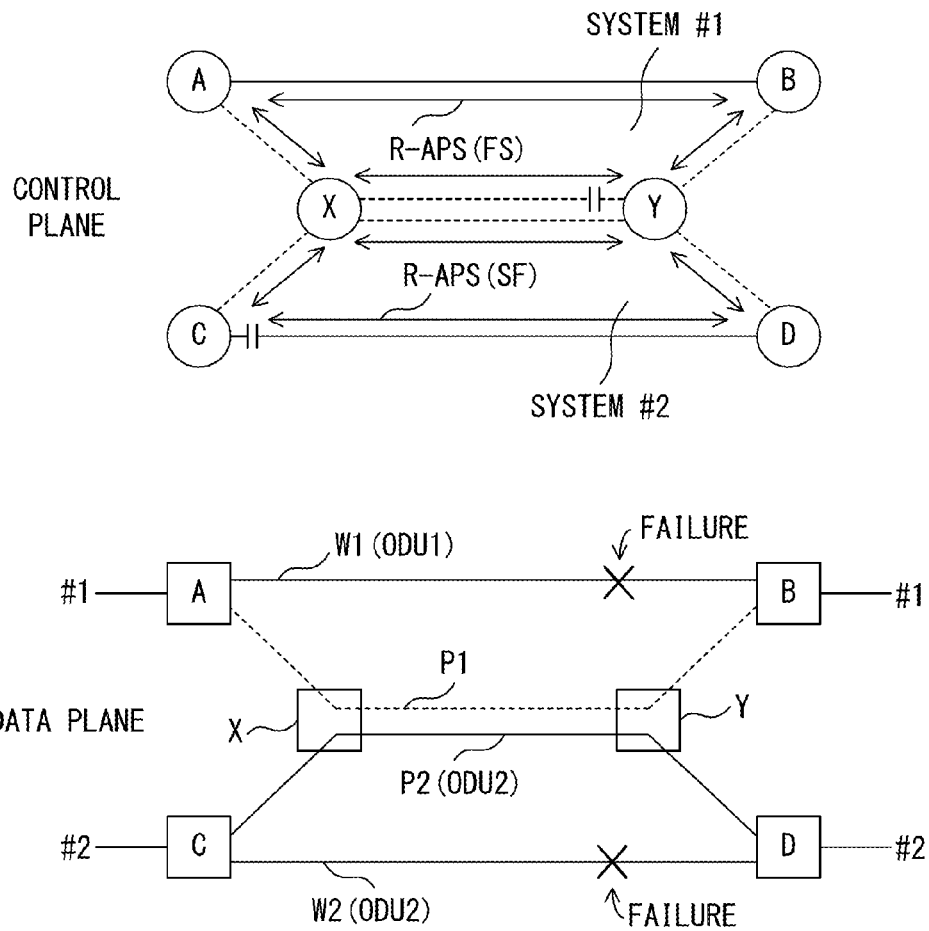
F I G. 1 0

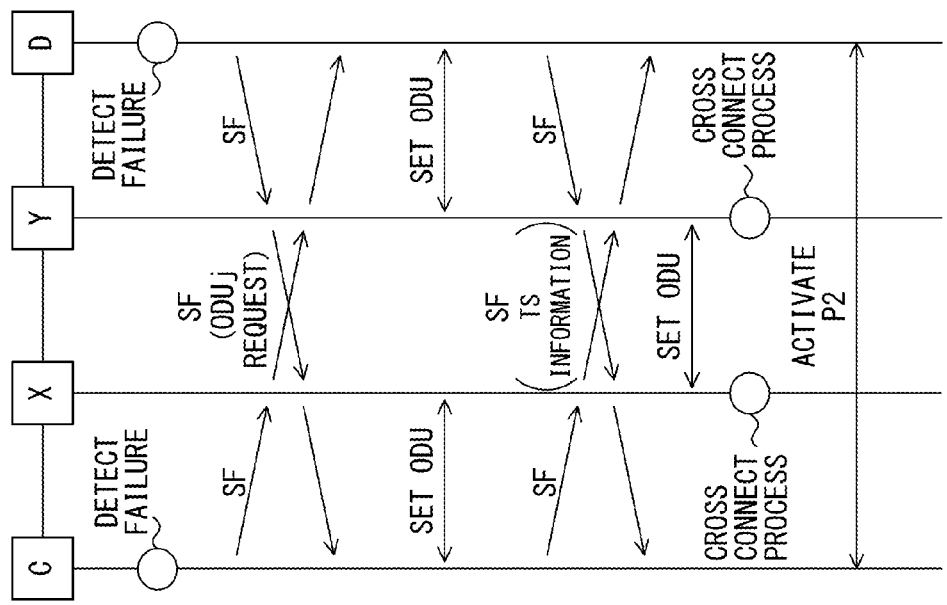
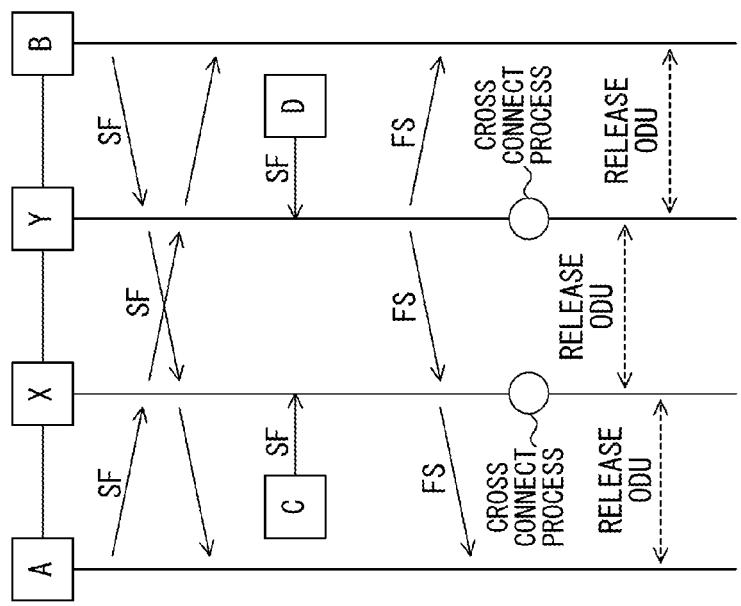

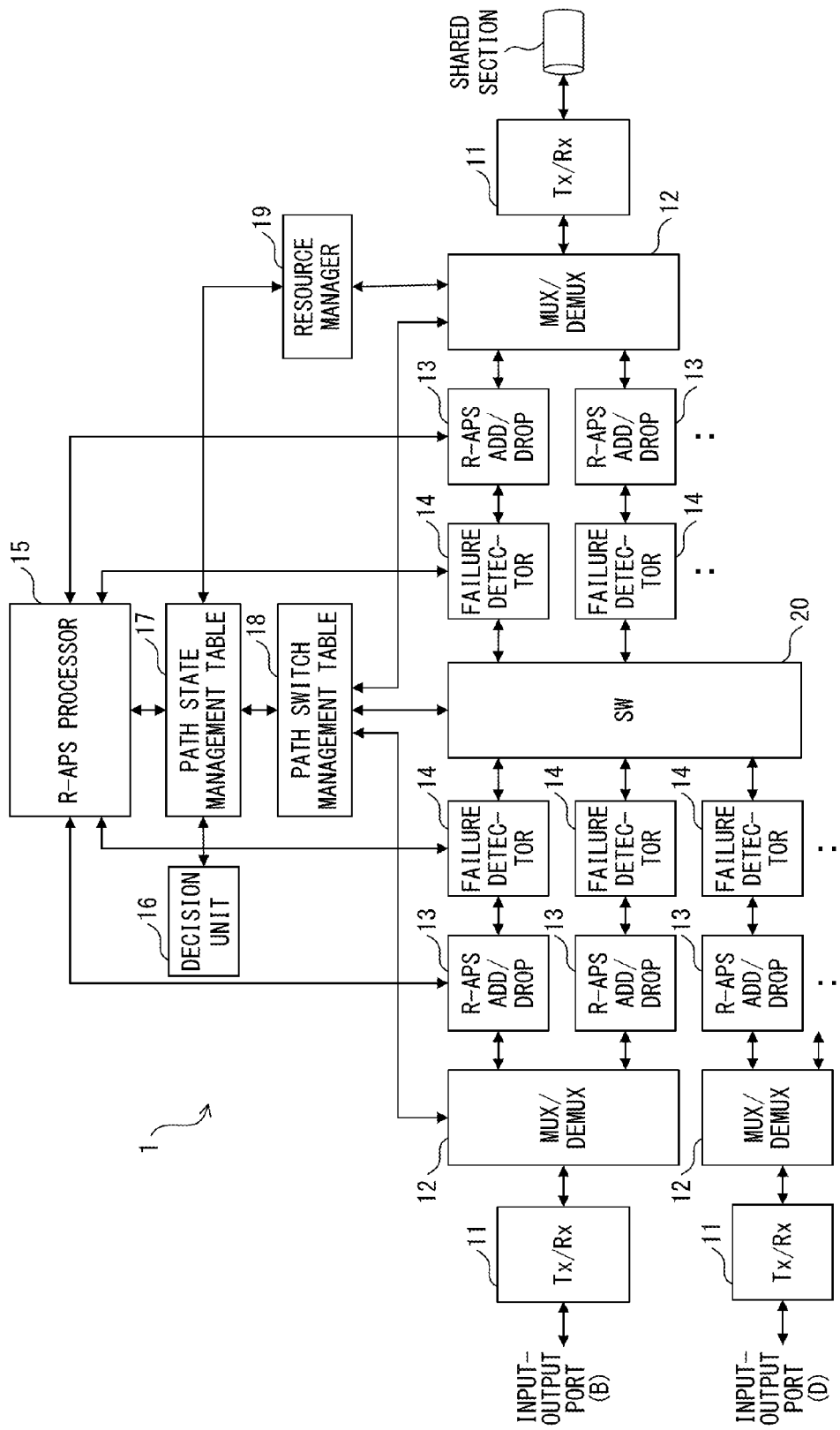
F I G. 13

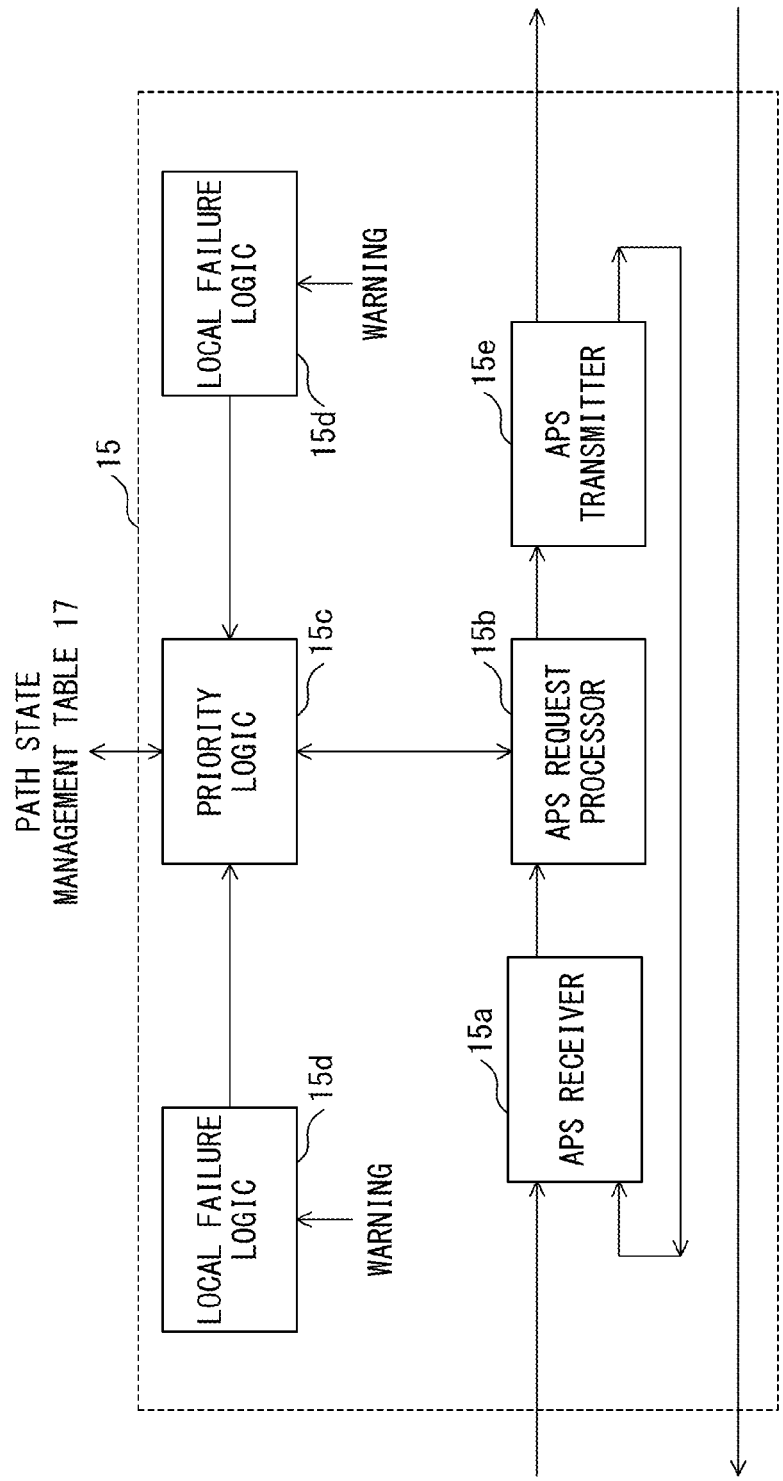
F I G. 14

| PATH ID | PRIORITY | RECEIVED R-APS | LOCAL INFORMATION | LOCAL WARNING INFORMATION | STATE | TRANSMISSION R-APS |
|---|---|---|---|---|---|---|
| 1 | 2 | SF | No failure | No failure | Fail | (SF→)FS |
| 2 | 1 | SF | No failure | No failure | Protection | (NR→)SF |
| .. | .. | .. | .. | .. | .. | .. |
| n | i | NR | No failure | No failure | Idle | NR |

F I G. 1 5

| PATH ID | TRANSMISSION RATE | INPUT-OUTPUT PORT | STATE | SWITCH CONNECTION | INPUT-OUTPUT PORT (TS) | SHARED SECTION (TS) |
|---|---|---|---|---|---|---|
| 1 | 2 | B | Fail | NO (TERMINATION) | p, q | n/a |
| 2 | 4 | D | Protection | YES | a, b, c, d | e, f, g, h |
| : | : | : | : | : | : | : |
| n | 2 | P | Idle | NO (TERMINATION) | x, y | n/a |

F I G. 17

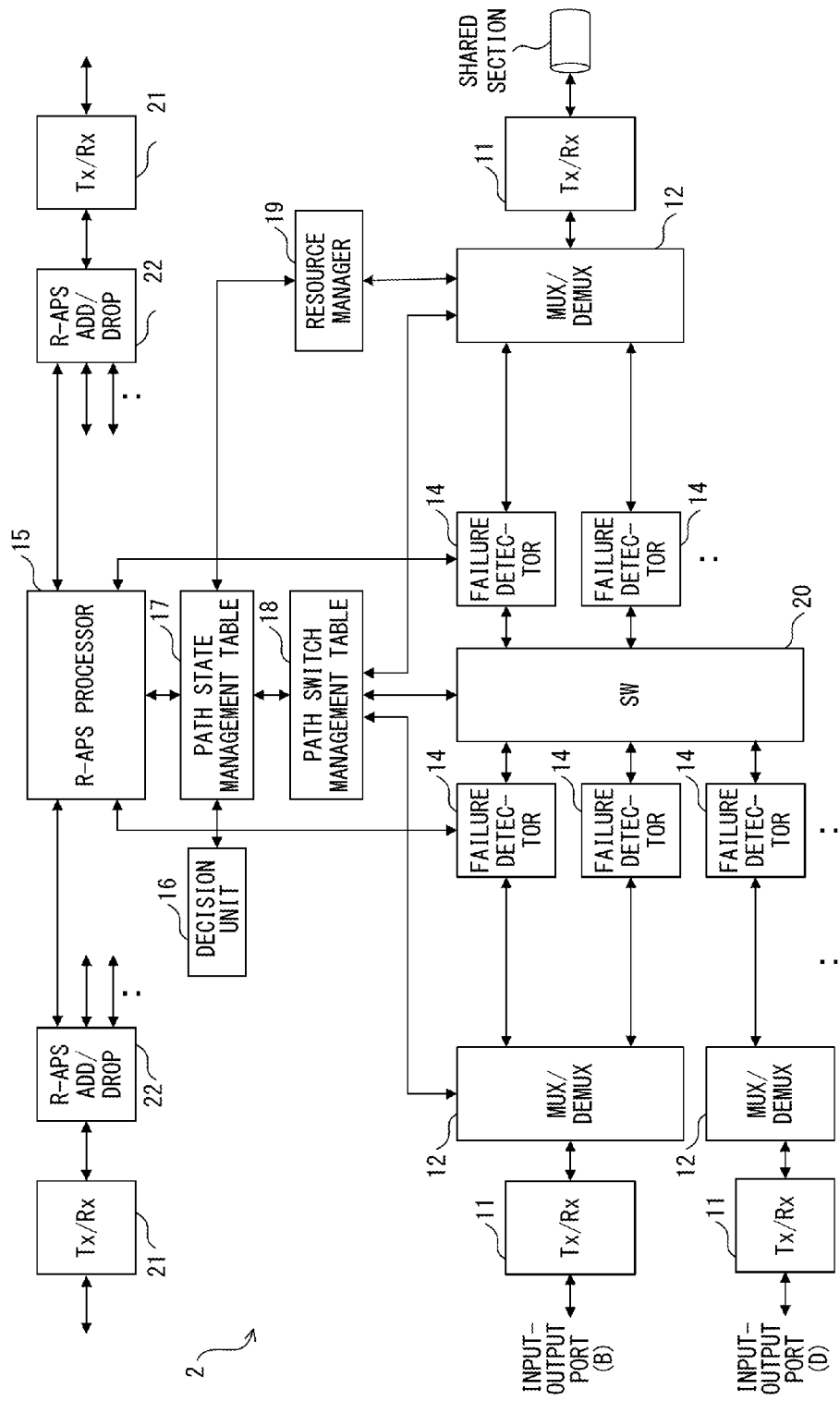
F I G. 18

| PATH ID | TRANSMISSION RATE | INPUT-OUTPUT PORT (WORK SYSTEM) | INPUT-OUTPUT PORT (PROTECTION SYSTEM) | STATE | SWITCH CONNECTION DIRECTION |
|---|---|---|---|---|---|
| 1 | 2 | | | Fail | |
| 2 | 4 | D | X | Protection | X |
| .. | .. | .. | .. | .. | .. |

F I G. 2 0

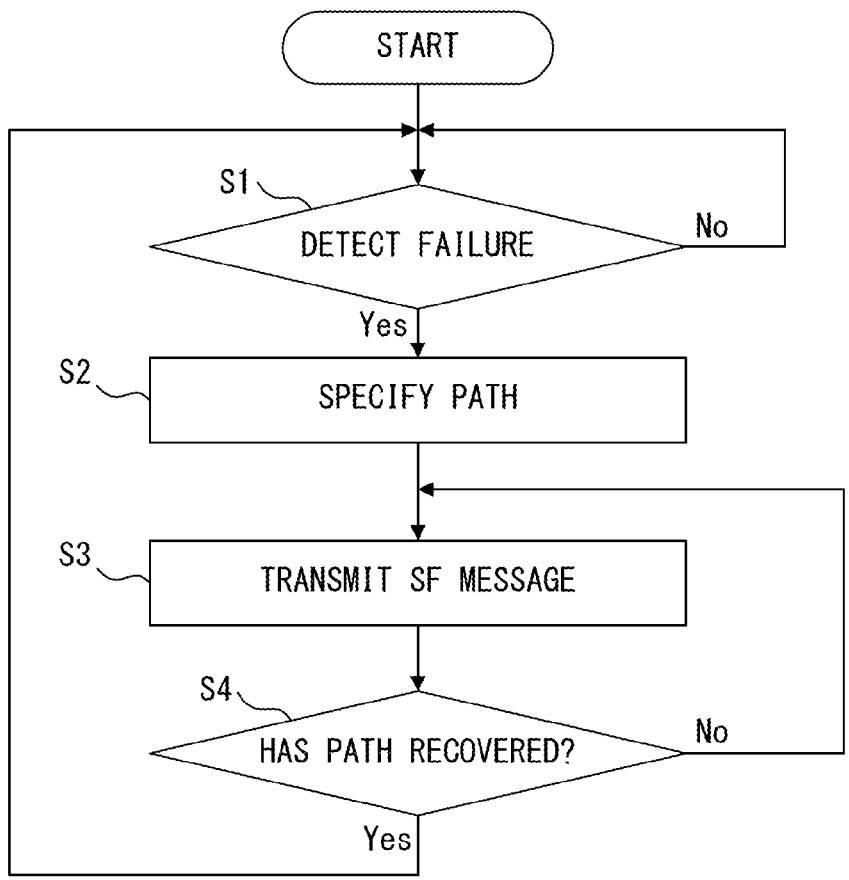
F I G. 21

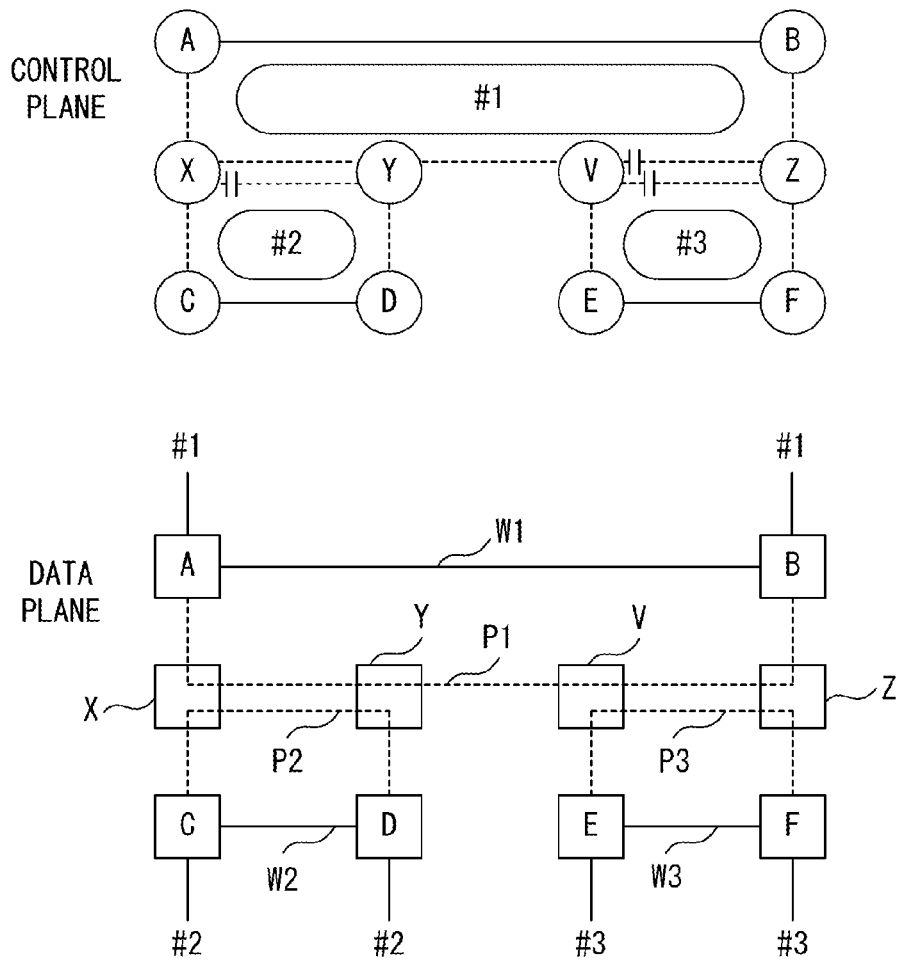
F I G. 24

PROTECTION PATH PROVIDING METHOD AND TRANSMISSION DEVICE

CROSS-REFERENCE TO RELATED APPLICATION

This application is based upon and claims the benefit of priority of the prior Japanese Patent Application No. 2014-006272, filed on Jan. 16, 2014, the entire contents of which are incorporated herein by reference.

FIELD

The embodiments discussed herein are related to a method for providing a protection path and a transmission device used in a communication network.

BACKGROUND

In a mesh network, a communication path may be configured between a start-point node and an end-point node via a desired route. This allows the mesh network to provide flexible and efficient operations.

Meanwhile, protection (or a redundancy configuration) is provided to enhance network reliability. That is, a protection path is configured for a work path. In this case, when a failure occurs in the work path, data is transmitted via the corresponding protection path.

Shared Mesh Protection (SMP) or Shared Mesh Restoration (SMR) is known as a method for providing a mesh network with protection. Shared Mesh Protection and Shared Mesh Restoration may hereinafter be collectively referred to as Shared Mesh Protection.

FIG. 1 is an example of Shared Mesh Protection. In the example depicted in FIG. 1, a path for transmitting data between nodes A and B and a path for transmitting data between nodes C and D are requested.

A work path W1 and a protection path P1 are configured between the nodes A and B. The protection path P1 passes nodes X and Y. A work path W2 and a protection path P2 are configured between the nodes C and D. The protection path P2 also passes the nodes X and Y. That is, the protection paths P1 and P2 overlap each other in a section between the nodes X and Y. A section of a line that is shared by a plurality of protection paths may hereinafter be referred to as a "shared section".

In the network above, when a failure occurs in the work path W1, a channel between the nodes X and Y is used to achieve the protection path P1. Meanwhile, when a failure occurs in the work path W2, a channel between the nodes X and Y is used to achieve the protection path P2. That is, a plurality of paths share resources for a communication between the nodes X and Y (e.g., communication band). Thus, Shared Mesh Protection may provide redundancy while using communication resources efficiently.

For Shared Mesh Protection, ITU-T has prepared, for example, Recommendation 808.3. Studies of Shared Mesh Protection for an OTN (Optical Transport Network) are also ongoing.

A proposed related art is a transmission system which performs protection for node failures by using protection paths equipped by a shared node protection system for each transmission path on a network formed of a plurality of nodes (e.g., Japanese Laid-open Patent Publication No. 2007-110366). In addition, a method has been proposed for efficiently carrying out settings wherein the bandwidth sharing among protection paths is taken into account (e.g., Japanese Laid-open Patent Publication No. 2007-49573).

In recent years, networks with flexibility and expandability have been required. Hence, various types of traffic may possibly be present on a network.

Assume that, in the network depicted in FIG. 1, a path for transmitting ODU1 between the nodes A and B is requested and a path for transmitting ODU2 between the nodes C and D is requested. In this case, a protection path for transmitting ODU1 and a protection path for transmitting ODU2 need to be provided within a shared section X-Y.

However, a method for configuring a plurality of protection paths with different capacities in a shared section (e.g., the shared section X-Y in FIG. 1) has not been established for Shared Mesh protection. Hence, when a failure occurs in a work path, it may take a long time to recover traffic via a corresponding protection path. When, for example, a failure occurs in the work path W1, an instruction to configure a path for transmitting "ODU1" is reported to the nodes within the shared section (corresponding to the nodes X and Y and nodes provided between the nodes X and Y in FIG. 1) in order. The individual nodes reconfigure a hardware circuit in order in accordance with the received instruction. Thus, it may take more than 50 milliseconds before traffic is recovered. That is, in a network that needs to satisfy a strict condition on a time of recovery from a failure (e.g., 50 milliseconds or shorter), it is difficult to provide Shared Mesh Protection in which protection paths with different capacities share a channel.

SUMMARY

According to an aspect of the embodiments, a protection path providing method is used in a network that includes a shared section in which a first protection path corresponding to a first work path to transmit a first traffic and a second protection path corresponding to a second work path to transmit a second traffic are configured. The method includes: transmitting a message that includes information indicating a transmission rate of the first work path via a logical ring, the logical ring being formed using a route for which the first work path is configured and a route for which the first protection path is configured, when a failure is detected in the first work path; and controlling a switch circuit installed in a transmission device provided at an end of the shared section in accordance with the message in such a manner as to transmit the first traffic via the shared section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates the configuration of a network in accordance with an embodiment;
FIG. 5 is a sequence diagram for a situation in which a failure has occurred;
FIG. 6 illustrates an exemplary SF message;
FIG. 7 illustrates an operation state of a network achieved at the time of recovery from a failure;

FIG. 8 is a sequence diagram at the time of recovery from a failure;

FIGS. 9 and 10 illustrate an operation state of a network achieved when a plurality of failures occur;

FIGS. 11A, 11B, 12A, and 12B are sequence diagrams for a situation in which a plurality of failures have occurred;

FIG. 13 illustrates an exemplary configuration of a transmission device;

FIG. 14 illustrates an exemplary R-APS processor;

FIG. 15 illustrates an exemplary path state management table;

FIG. 17 illustrates an example of a path switch management table;

FIG. 18 illustrates another example of the configuration of a transmission device;

FIG. 20 illustrates another example of a path switch management table;

FIG. 21 is a flowchart illustrating operations of a transmission device that detects a failure;

FIG. 24 illustrates the configuration of a network in accordance with another embodiment 2;

DESCRIPTION OF EMBODIMENTS

Figure 1:
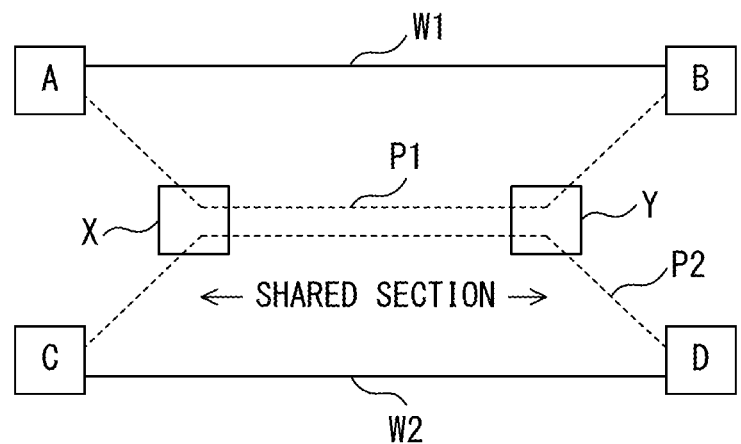
FIG. 1 illustrates an example of Shared Mesh Protection.

FIG. 2 illustrates the configuration of a network in accordance with an embodiment. As in the case of FIG. 1, the network depicted in FIG. 2 includes nodes A-D, X, and Y. However, the network may include additional nodes. For example, one or more nodes may be provided between the nodes X and Y. Each node is provided with a transmission device. FIG. 2 also depicts a data plane and a control plane. The portion depicting the data plane uses rectangles to represent the nodes, and the portion depicting the control plane uses circles to represent the nodes.

In the example depicted in FIG. 2, a path #1 for transmitting data between the nodes A and B and a path #2 for transmitting data between the nodes C and D are requested. The path #1 between the nodes A and B is achieved by a set of a work path W1 and a protection path P1. The protection path P1 passes the nodes X and Y. The path #2 between the nodes C and D is achieved by a set of a work path W2 and a protection path P2. The protection path P2 also passes the nodes X and Y. That is, the protection paths P1 and P2 overlap each other in a section between the nodes X and Y. That is, the network includes a shared section X-Y.

The data plane transmits data between nodes. Data transmitted within the data plane is, for example, client data. Meanwhile, the control plane transmits control data between nodes. Control data transmitted within the control plane includes a message for controlling the configuration and switching of a path.

In a network according to the embodiment, control of the configuration and switching of a path is achieved in accordance with, for example, an Auto Protection Switching (ASP) provided by Ethernet Ring Protection (ERP). Note that Ethernet Ring Protection is described by, for example, G.8032.

The Auto Protection Switching provided by Ethernet Ring Protection may hereinafter be referred to as a "ring APS (or R-APS)".

Accordingly, in a network according to the embodiment, a logical ring is defined for each path within the control plane so as to achieve Shared Mesh Protection. That is, as illustrated in FIG. 2, a logical ring #1 is defined for the path #1, and a logical ring #2 is defined for the path #2. Each logical ring is formed using a route for which a corresponding work path is configured and a route for which a protection path is configured. The work path W1 is configured between the nodes A and B. The protection path P1 is configured in a route extending from the node A via the nodes X and Y to the node Y. Thus, the logical ring #1 for controlling the path #1 is formed on a route extending from the node A via the nodes X, Y, and B and back to the node A.

The transmission device provided at each node has implemented therein software and hardware for processing an R-APS protocol (or a protocol having a function equivalent to the R-APS protocol). That is, each transmission device has a function for processing an R-APS message. However, in a network in accordance with an embodiment, an extended R-APS message may be used, as will be described in detail hereinafter.

Figure 3:
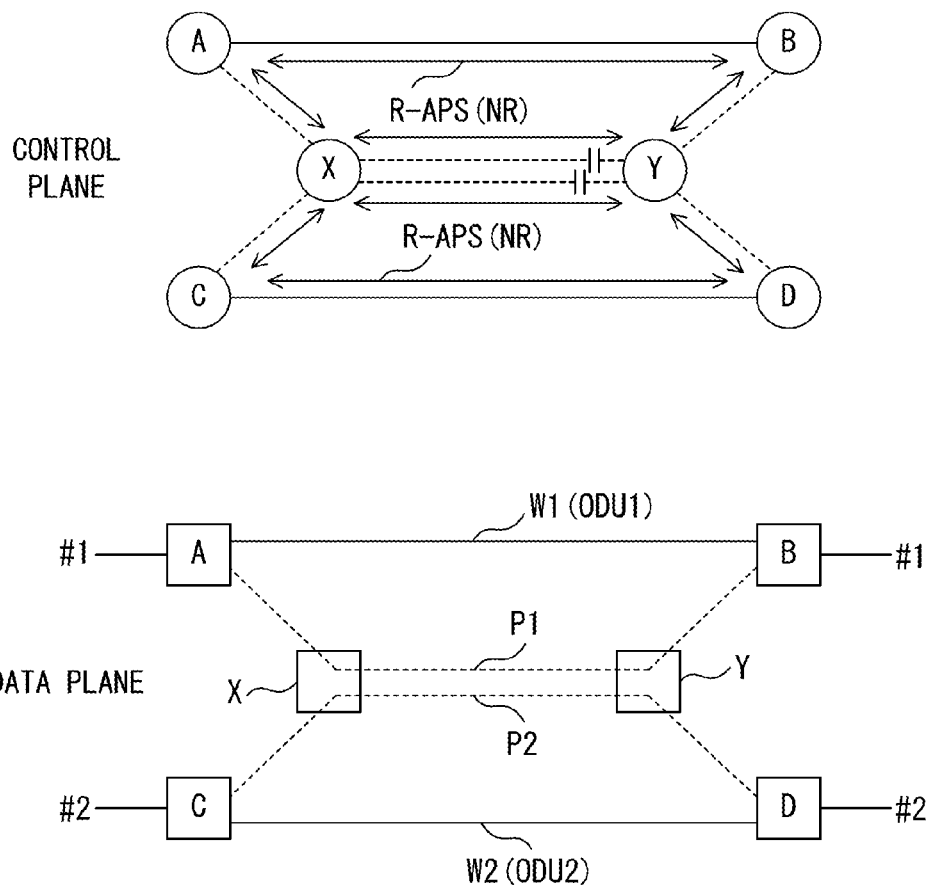
FIG. 3 illustrates an operation state of a network achieved when a failure does not occur.

FIG. 3 illustrates an operation state of a network achieved when a failure does not occur. In this example, the path #1 transmits ODU1 of the OTN. ODU1 may transmit data of about 2.5 Gbps. The path #2 transmits ODU2 of the OTN. ODU2 may transmit data of about 10 Gbps.

In a control plane, one owner node is designated for each logical ring. In this example, the node Y is designated as an owner node for the logical ring #1, and the node Y is also designated as an owner node for the logical ring #2. The owner node includes a blocking port to prevent data from continuously going around on a ring. That is, the owner node may discard data received via the blocking port. In the example depicted in FIG. 3, the node Y provides a blocking port for data received from the node X. However, the blocking port passes a specified message or control data. In one possible example, an R-APS message (or G.8032 message) passes through the blocking port. Note that "Revertive mode" is set for each logical ring.

When a failure does not occur in the network, requested data is transmitted via a work path in the data plane. That is, data of the path #1 is transmitted via the work path W1. Data of the path #2 is transmitted via the work path W2.

An R-APS message is transmitted between nodes within the control plane. In one possible example, each node periodically transmits an R-APS message. When a failure does not occur in the network, an NR (No Request) message is transmitted. The NR message is one of R-APS messages and indicates that there is no request for configuring or switching of a path. The NR message is a control message and is thus processed without being blocked by the blocking port. Note that in FIG. 3 an NR message is denoted as "R-APS (NR)".

Figure 4:
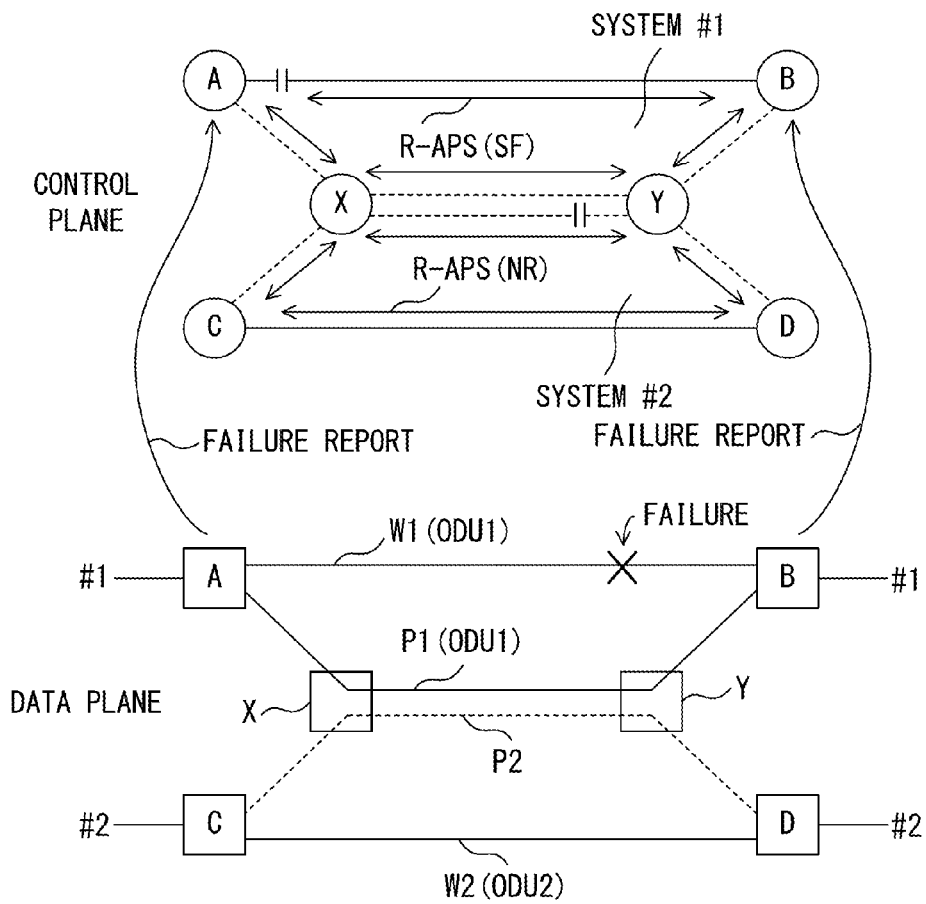
FIG. 4 illustrates an operation state of a network achieved when a failure occurs.

FIG. 4 illustrates an operation state of a network achieved when a failure occurs. In this example, a failure has occurred in the work path W1 on a data plane. In this case, a failure is detected at nodes provided at both ends of the work path W1. That is, a failure is detected at each of the nodes A and B. Accordingly, in a transmission device provided at each of the nodes A and B, the occurrence of a failure is reported from the data plane to the control plane. Note that a transmission device provided at a node i (i is A, B, C, D, X, Y, and so on) may hereinafter be referred to as a "node device i". For example, a node device provided at the node Y may be referred to as a "node device Y".

When an occurrence of a failure is detected, an SF (Signal Fail) message is transmitted in the control plane. That is, an SF message is transmitted between nodes within a system #1 for providing a path #1 (system that includes the nodes A, X, Y, and B). The SF message is one of R-APS messages and is used to report an occurrence of a failure. The SF message is a control message and is thus processed without being blocked by the blocking port. Note that in FIG. 4 an SF message is denoted as "R-APS (SF)".

A failure has not occurred in a system #2 for providing a path #2 (a system that includes nodes C, X, Y, and D). Hence, an NR message is transmitted between nodes within the system #2. However, when a failure is detected in the system #1, an FS message may be transmitted between nodes within the system #2. The FS message will be described hereinafter.

When an SF message is transmitted between nodes within the control plane of the system #1, the following switching operation is performed in the data plane. The node device A guides client data to the node X and guides data received from the node X to a client. The node device X guides data received from the node A to the node Y and guides data received from the node Y to the node A. The node device Y guides data received from the node B to the node X and guides data received from the node X to the node B. The node device B guides client data to the node Y and guides data received from the node Y to a client. As a result of this switching operation, traffic that has been transmitted via the work path W1 comes to be transmitted via the protection path P1. That is, a channel in the shared section X-Y is configured to provide the protection path P1.

In this case, the shared section X-Y is configured to provide a capacity (or a transmission rate) for the work path W1. In this example, the setting is achieved by an SF message transmitted in the control plane.

When a failure occurs in the work path W1, one of the nodes at both ends of the work path W1 is designated as new owner node. In the example depicted in FIG. 4, an owner node has been switched from the node Y to the node A in the system #1 for providing the path #1. In this case, the node A provides a blocking port that blocks data received from the node B.

FIG. 5 is a sequence diagram illustrating operations of a network performed when a failure has occurred. The sequence diagram depicts operations performed when the failure illustrated in FIG. 4 has occurred. That is, a failure has occurred in the work path W1 in the network depicted in FIG. 4. In this case, the failure is detected at each of the nodes A and B. Accordingly, the node devices A and B each transmit an SF message.

FIG. 6 illustrates an exemplary SF message. The SF message is one of R-APS messages, as described above. Hence, the format of the SF message conforms to G.8032. That is, the message includes DA/SA (a destination address and a source address), Ethernet type information, an OAM common header, and an R-APS region. The R-APS region includes a reserved region of 24 bits. A "path ID" and a "transmission rate" are written to the reserved region of the SF message used in this example. A path ID identifies a path requested by a user. In the examples depicted in FIGS. 2-4, the path #1 and the path #2 are identified. A transmission rate represents a transmission rate requested by a user. In one possible example, "ODU1" is set for the path #1, and "ODU2" is set for the path #2.

Extended TLV is assigned to an SF message when needed. In this example, when an SF message is transmitted within a shared section, extended TLV is assigned to the SF message. Communication resource information may be stored in extended TLV. Communication resource information includes a "transmission rate" and "TS (Tributary Slot) information". In this example, the transmission rate is the same as a transmission rate written to the R-APS region. TS information indicates a slot used to transmit data in OTN. Extended TLV may be achieved by, for example, RFC 4328 or a Label Request/Label Space described in draft-ietf-ccamp-gmpls-signaling-g709v3. In this case, a transmission rate is reported using Label Request. TS information is reported using Label Space. When a plurality of overlapping paths configured in a shared section (corresponding to the protection paths P1 and P2 in this example) have the same transmission rate, extended TLV does not need to be assigned to an SF message.

The following information is written to the R-APS region of an SF message transmitted from the node A.
(1) Path ID: #1 (path in which a failure has been detected)
(2) Transmission rate: ODU1 (transmission rate of the work path W1)
The SF message is transmitted to the node B via the nodes X and Y. A similar path ID and transmission rate have also been written to the R-APS region of an SF message transmitted from the node B. However, the SF message transmitted from the node B is transmitted to the node A via the nodes Y and X.

In this example, an ODU1 channel that is identical with the work path W1 is pre-configured between the nodes A and X and between the nodes B and Y. That is, the switch circuits of the node devices A and X are each configured in advance in a state such that ODU1 data is transmitted between the nodes A and X. Similarly, the switch circuits of the node devices B and Y are configured in advance in a state such that ODU1 data is transmitted between the nodes B and Y. In addition, if a node is present between the nodes A and X and/or between the nodes B and Y, the switch circuit in the transmission device provided in the node is also configured in advance in a state such that ODU1 data is transmitted. Thus, when the SF message is transmitted as described above, the ODU1 channel is activated between the nodes A and X and between the nodes B and Y.

In the shared section X-Y, extended TLV is assigned to the SF message. That is, at the node X, extended TLV is assigned to the SF message transmitted from the node A. Similarly, at the node Y, extended TLV is assigned to the SF message transmitted from the node B. Extended TLV includes an ODUj request. In this case, "ODU1" is designated as the ODUj request.

Upon receipt of the SF message that include an ODUj request, the node devices X and Y each select as many tributary slots as correspond to a designated transmission rate. When, for example, ODU1 is designated, two tributary slots are selected. When ODU2 is designated, four tributary slots are selected.

Then, the node devices A and B each transmit a second SF message. These messages are transmitted in the same manner as the first SF messages. However, in the shared section X-Y, an extended TVL that includes TS information is assigned to each of the second SF messages. In this case, the node devices X and Y each assign, to the SF message, extended TLV that includes TS information designating a tributary slot that has been selected in advance in accordance with the ODUj request.

Upon receipt of an SF message that includes the TS information, each of the node devices X and Y configures a switch circuit therein to transmit data using a designated tributary slot. That is, a cross-connect process is performed for the nodes X and Y, and an ODU1 channel is configured between the nodes X and Y. As a result, a protection path P1 is activated for transmitting ODU1 data between the nodes A and B via the nodes X and Y. That is, switching from the work path W1 to the protection path P1 is completed.

As described above, in the protection path providing method of the embodiment, a message that reports the occurrence of a failure (corresponding to the SF message of the example) is used to report information indicating the capacity (corresponding to the transmission rate of the example) of a path to be recovered to a node within a shared section. In addition, the message may be used to report, to a node within a shared section, information indicating the assignment of communication resources for transmitting traffic of a path in which a failure has occurred (corresponding to the designation of a tributary slot of an OTN in the example). Hence, Shared Mesh Protection wherein protection paths with different capacities share a channel may be provided. Path switching is achieved using a message for reporting the occurrence of a failure, thereby shortening the time needed to recover data transmission by using a protection path after a failure has occurred in a work path.

FIG. 7 illustrates an operation state of a network achieved at the time of recovery from a failure. In this example, the network has recovered from the failure depicted in FIG. 4. That is, the network has recovered from a failure that has occurred in the work path W1 on the data plane.

In this case, the recovery from the failure is detected at the nodes provided at both ends of the work path W1. That is, the nodes A and B each detect the recovery from the failure. Accordingly, for each of the node devices A and B, the recovery from the failure is reported from the data plane to the control plane. The node devices A and B each stop transmitting an SF message and start transmitting an NR message. This operation conforms to G.8032. The owner node changes from the node A to the node Y.

In response to the detection of the recovery from the failure, the node devices A and B may each restart data transmission via the work path W1. Alternatively, in response to the change of the owner node from the node A to the node Y, the node devices A and B may each restart data transmission via the work path W1.

FIG. 8 is a sequence diagram illustrating network operations at the time of recovery from a failure. In this example, the work path W1 has recovered from a failure, as depicted in FIG. 7. In this case, the nodes A and B each detect the recovery from the failure. Accordingly, the node devices A and B each stop transmitting an SF message and start transmitting an NR message. The node devices A and B each activate a guard timer. The node devices A and B refuse reception of an R-APS message transmitted from another node until the guard timer expires. Thus, the node devices A and B are not affected by an SF message issued after the work path W1 recovers from the failure.

Upon receipt of an NR message, the transmission device provided in the owner node (i.e., the node device Y) activates a guard timer. When the guard timer of the node device Y expires, the node device Y transmits an R-APS message that includes an NR message and an RB (RPL Blocked) message. Upon receipt of the message, the node devices A and B each control the switch circuit in a manner such that data of the path #1 is transmitted via the work path W1. After the path switching is performed, data of the path #1 is transmitted via the work path W1.

FIGS. 9 and 10 illustrate an operation state of a network achieved when a plurality of failures occur. In this example, the failure depicted in FIG. 4 has occurred and then another failure has occurred in the work path W2. In this case, the failure is detected at the nodes provided at both ends of the work path W2. That is, the nodes C and D each detect the failure. Accordingly, for each of the node devices C and D, the occurrence of the failure is reported from the data plane to the control plane.

When the occurrence of the failure in the work path W2 is detected, an SF message is also transmitted between nodes within the system #2 for providing the path #2 (a system that includes nodes C, X, Y, and D). That is, both the SF message of the system #1 and the SF message of the system #2 are transmitted within the shared section X-Y, as depicted in FIG. 9. Hence, at least the transmission devices provided within the shared region X-Y receive the SF message of the system #1 and the SF message of the system #2.

A channel of the shared region is configured in a manner such that, when a failure occurs in both the path #1 and the path #2, the channel provides a protection path for the path having a higher priority. Assume that the path #2 has a higher priority than the path #1. In this case, as depicted in FIG. 10, the channel of the shared section X-Y is configured to provide the protection path P2, which corresponds to the work path W2. That is, the channel of the shared section X-Y is switched from a state for providing the protection path P1 to a state for providing the protection path P2. This path switching operation is achieved using the following procedure.

In accordance with an SF message corresponding to the path #2, i.e., a path having a higher priority, the node devices X and Y activate the protection path P2, i.e., a path configured in the shared region X-Y. This procedure is substantially the same as the procedure described above with reference to FIG. 4, and hence descriptions thereof are omitted herein. However, the protection path P2 transmits ODU2 data.

Upon receipt of the SF message of the system #1 and the SF message of the system #2, the node device Y, i.e., an owner node, transmits an FS (Forced Switch) message to a logical ring corresponding to the path having a lower priority (i.e., the path #1). The FS message is one of R-APS messages and is used to forcibly switch a path. As described above with reference to the operation of FIG. 4, the FS message is not blocked by the blocking port. Note that the FS message is denoted as "R-APS (FS)" in FIG. 10.

The FS message instructs to switch a data transmission route from a protection path back to a work path in the system #1. Hence, upon receipt of the FS message, the node devices A and B each configure the switch circuit to transmit data via the work path #1. The owner node of the system #1 is changed from the node A back to the node Y.

FIGS. 11A and 11B are sequence diagrams illustrating operations of a network for a situation in which a plurality of failures have occurred. The sequence diagrams depict operations performed when the failures depicted in FIGS. 9-10 have occurred. That is, while the protection path P1 is being operated in the shared section X-Y, a failure also occurs in the work path W2. FIG. 11A illustrates operations of the system #1 (system that includes the nodes A, X, Y, and B) for providing the path #1. FIG. 11B illustrates operations of the system #2 (system that includes the nodes C, X, Y, and D) for providing the path #2.

Before a failure occurs in the work path #2, SF messages are transmitted between the nodes in the system #1, as depicted in FIG. 11A. When a failure is detected in the work path #2, the node devices C and D each transmit an SF message, as depicted in FIG. 11B. That is, SF messages are also transmitted between the nodes within the system #2. Accordingly, the node devices X and Y each receive the SF message of the system #1 and the SF message of the system #2, as depicted in FIG. 11A.

In this example, the path #2 has a higher priority than the path #1. Hence, the node devices X and Y perform path switching in accordance with the SF message of the system #2. The SF message of the system #2 includes information indicating the transmission rate of the work path W2 (i.e., ODU2). A path for transmitting ODU2 data of the path #2 is activated between the nodes C and X and between the nodes D and Y.

Subsequently, the node devices C and D each transmit a second SF message, as depicted in FIG. 11B. As with the first SF messages, those SF message are transmitted via a logical ring of the system #2. However, extended TLV that includes TS information is assigned to the second SF messages within the shared section X-Y. Since the path #2 transmits ODU2 data, the node devices X and Y each assign, to the SF message, extended TLV that includes TS information designating four tributary slots. Thus, a path for transmitting ODU2 data of the path #2 is configured between the nodes X and Y. As a result, the protection path P2, i.e., a path that transmits ODU2 data of the path #2 between the nodes C and D via the nodes X and Y, is activated as illustrated in FIG. 11B.

Meanwhile, as depicted in FIG. 11A, in the system #1, i.e., the system having the lower priority, the node device Y transmits FS messages upon receipt of the SF message of the system #1 and the SF message of the system #2. Note that the node device Y is a transmission device provided in the owner node. The FS message releases the protection path P1, i.e., a path for transmitting ODU1 data of the path #1. In this case, since a failure has occurred in the work path W1, data of the path #1 is not transmitted between the nodes A and B. However, when the work path W1 recovers prior to the work path W2, the transmission of data of the path #1 is restarted using the work path W1.

When the work path W2 recovers prior to the work path W1, NR messages are transmitted between nodes via the logical ring of the system #2. In this case, in the system #1, FS messages stop, and, SF messages are transmitted between nodes after the counting performed by the guard timer expires. This configures a channel of the shared section X-Y so as to provide the protection path P1, as in the procedure depicted in FIG. 5.

Figure 12A:
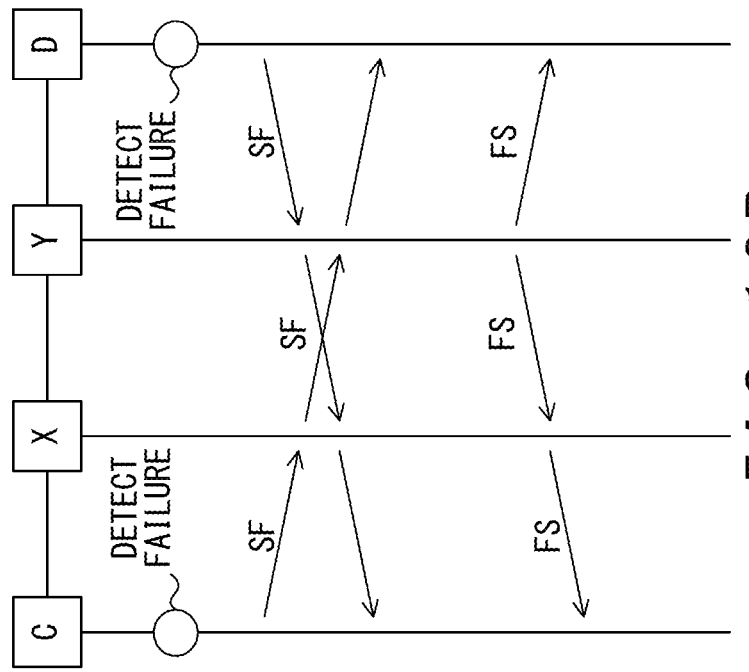
Figure 12B:
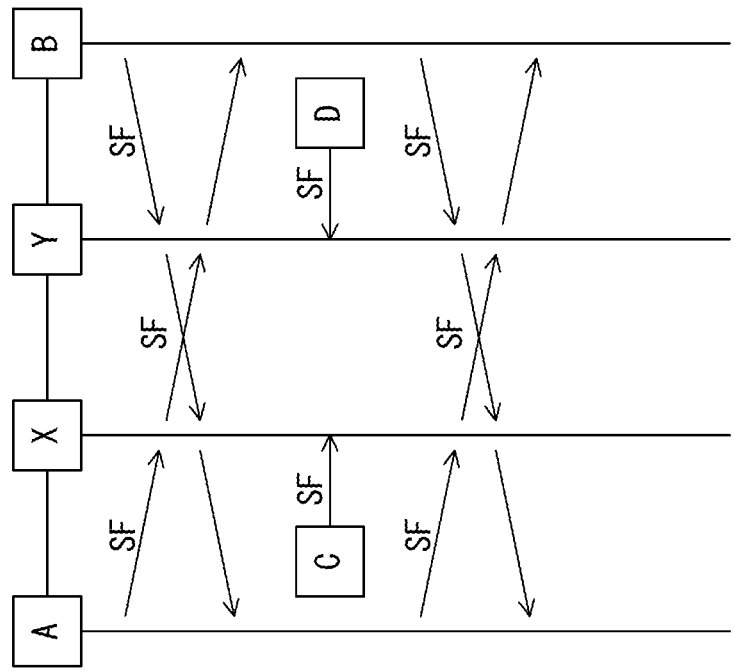

As with FIGS. 11A and 11B, FIGS. 12A and 12B are sequence diagrams illustrating operations of a network for a situation in which a plurality of failures have occurred. However, FIGS. 12A and 12B illustrate a sequence for a situation in which a path in which a later failure has occurred has a higher priority than a path in which an earlier failure has occurred.

As described above, SF messages are transmitted between nodes within the system #1 before the failure in the work path #2 occurs. When the failure in the work path W2 is detected, SF messages are also transmitted between nodes within the system #2. Accordingly, the node devices X and Y receive the SF messages of the system #1 and the system #2, as illustrated in FIG. 12A.

In the example depicted in FIGS. 12A and 12B, however, the path #2 has a lower priority than the path #1. Hence, the node devices X and Y perform the path switching based on the SF message of the system #1. However, at that moment, the path switching based on the SF message of the system #1 has already been completed. Hence, settings of paths do not change in the system #1.

Meanwhile, in the system #2, the node device Y transmits an FS message that instructs to switch the transmission route for data from a protection path back to a work path. Note that the node device Y is a transmission device provided in the owner node of the system #2. However, at that moment, the work path W2 has already been configured as the transmission route for data. Hence, settings of paths also do not change in the system #2.

FIG. 13 illustrates an exemplary configuration of a transmission device. The following will describe a transmission device provided at an end of a shared section (e.g., node device Y).

As illustrated in FIG. 13, a transmission device 1 includes transceiver devices 11, multiplex/demultiplex units 12, R-APS message add/drop units 13, failure detectors 14, an R-APS processor 15, a decision unit 16, a path state management table 17, a path switch management table 18, a resource manager 19, and a switch circuit 20. The transmission device 1 may include another function.

The transceiver device 11 is provided for each physical channel. The transceiver device 11 terminates a received signal. The transceiver device 11 transmits a signal that is to be transmitted to another node. Using the contents of the path switch management table 18, the multiplex/demultiplex unit 12 separates received signals in accordance with path IDs and guides each of the signals to a corresponding R-APS message add/drop unit 13. The multiplex/demultiplex unit 12 multiplexes generated signals for each path ID. The corresponding R-APS message add/drop unit 13 is provided for each path ID. The R-APS message add/drop unit 13 extracts an R-APS message from a received signal and guides the R-APS message to the R-APS processor 15. The R-APS message add/drop unit 13 multiplexes an R-APS message onto a signal from the switch circuit 20. The failure detector 14 detects a failure in a path. When, for example, a frame synchronization of a received signal cannot be established, the failure detector 14 may decide that a failure has occurred in a path. The R-APS processor 15 processes an R-APS message.

FIG. 14 illustrates an example of the R-APS processor 15. The R-APS processor 15 is supplied with an R-APS message received from another node. An APS receiver 15a checks the validity of the received R-APS message. An APS request processor 15b and a priority logic 15c process the received R-APS message. In this case, the priority logic 15c refers to the path state management table 17 to process the R-APS message. The priority logic 15c processes the R-APS message in accordance with an output signal of a local failure logic 15d. The APS request processor 15b and the priority logic 15c generate an R-APS message to be transmitted. An APS transmitter 15e transmits the generated R-APS message. The R-APS processor 15 is provided for each path. Operations of the R-APS processor 15 are described by, for example, G.8032.

In accordance with the received R-APS message and the contents of the path state management table 17, the decision unit 16 decides a path state and selects an R-APS message to be transmitted to a subsequent node.

As depicted in FIG. 15, the path state management table 17 stores information for managing the state of each path. "PRIORITY" indicates the priority of a path. In one possible example, a user or network administrator specifies the priority of a path in advance. "RECEIVED R-APS" indicates the type of a received R-APS message. "LOCAL INFORMATION" indicates the state of a communication with an adjacent node. "LOCAL WARNING INFORMATION" indicates the presence/absence of a warning detected in a communication with an adjacent node on a shared-section side. "STATE" indicates the state of a path. "TRANSMISSION R-APS" indicates the type of an R-APS message to be transmitted.

Figure 16:
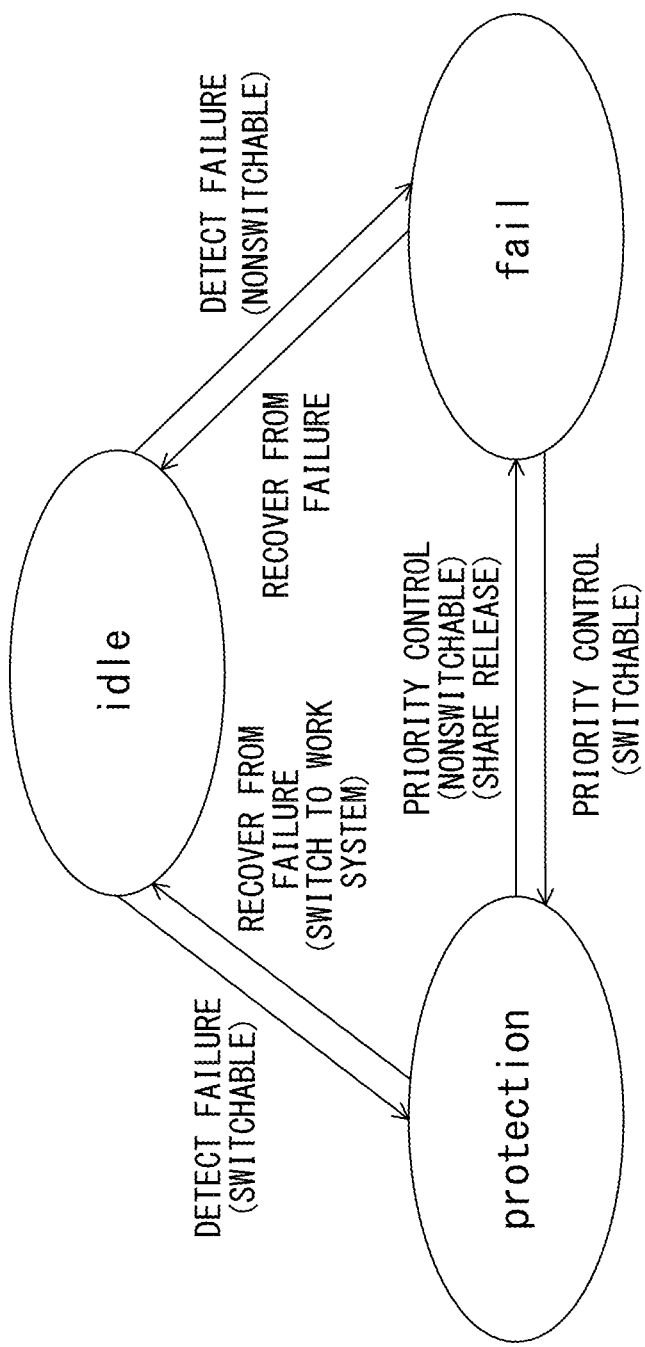
FIG. 16 illustrates a state transition of a path.

FIG. 16 illustrates a state transition of a path indicated in the path state management table 17. In this example, the state of a path is one of "idle", "protection", or "fail". When a failure is detected in a path in an idle state and switching from a work path to a protection path is performed, the path state transits to "protection". When the path in the protection state recovers from the failure and switching from the protection path to the work path is performed, the path state is put back into "idle". When a failure is detected in the path in the idle state and switching from the work path to the protection path cannot be performed, the path state transits to "fail". When the path in the fail state recovers from the fail, the path state is put back into "idle". When a protection path corresponding to a path in the protection state is made to be unusable as a result of the priority control of paths, the path state transits to "fail". When a protection path corresponding to a path in the fail state is made to be usable as a result of the priority control of paths, the path state transits to "protection".

As illustrated in FIG. 17, the path switch management table 18 stores information for managing switching of each path. "TRANSMISSION RATE" indicates a transmission rate (or bandwidth) requested by the user. In an OTN network, as depicted in FIG. 17, the transmission rate may be represented using the number of tributary slots used to transmit data. "INPUT-OUTPUT PORT" indicates a port through which data is input and output. However, the input-output ports do not include a shared-section-side port. In one possible example, the node device Y includes "B (port for connection to the node B)" and "D (port for connection to the node D)" as the input-output ports. "STATE" is the same as the information tributary-slot managed by the path-state management table 17.

"SWITCH CONNECTION" indicates whether the cross connect process is performed by the switch circuit 20. When the state of a path is "idle" or "fail", a received signal is terminated, and hence the cross-connect process is not performed. "INPUT-OUTPUT PORT TS" indicates a tributary slot designated to transmit data in a non-shared section. "SHARED-SECTION-SIDE PORT TS" indicates a tributary slot designated to transmit data in a shared section.

The resource manager 19 manages communication resources available by the transmission device. In an OTN network, the resource manager 19 manages a available tributary slot (or an unused tributary slot). The switch circuit 20 controls a forwarding destination of traffic in accordance with the contents of the path switch management table 18. That is, the switch circuit 20 configures a path in accordance with the contents of the path switch management table 18.

The following will describe operations of the transmission device depicted in FIG. 13 with reference to the examples depicted in FIGS. 9-10. Assume that the transmission device is provided in the node Y. That is, descriptions will be given of operations of the node device Y illustrated in FIGS. 9-10. Assume that the node device Y includes the path state management table 17 depicted in FIG. 15 and the path switch management table 18 depicted in FIG. 17.

The node device Y receives an SF message of the system #1 and an SF message of the system #2. By so doing, the R-APS processor 15 writes "RECEIVED R-APS: SF" for the path #1 and the path #2 in the path-state management table 17. Note that priority 2 is assigned to the path #1 and priority 1 is assigned to the path #2. That is, the path #2 is assigned a higher priority than the path #1. Hence, the decision unit 16 controls and puts the path #2 in the protection state and controls and puts the path #1 in the fail state. Consequently, "STATE: Fail" is written for the path #1, and "STATE: Protection" is written for the path #2. In addition, as "TRANSMISSION R-APS" indicates, an FS message and an SF message are respectively transmitted to the control planes of the path #1 and path #2.

During the state control above, path switching is performed using the path switch management table 18. First, the path #1 is controlled and put in the fail state, as described above. Hence, the decision unit 16 writes "SWITCH CONNECTION: NO" for the path #1 in the path switch management table 18. The switch circuit 20 controls data of the path #1 in accordance with the contents of the path switch management table 18. In this example, in accordance with "SWITCH CONNECTION: NO", the switch circuit 20 terminates data of the path #1 input from an input-output port B without forwarding the data. Note that the input-output port B is a physical port accommodating a channel between the nodes Y and B.

Meanwhile, the path #2 is controlled and put in the protection state, as described above. Hence, the decision unit 16 writes "SWITCH CONNECTION: YES" for the path #2 in the path switch management table 18. Assume that an SF message reports "ODUj=ODU2" in the sequence depicted in FIG. 11B. In this case, the decision unit 16 refers to the resource manager 19 to search for four tributary slots available to transmit ODU2 data. In this example, tributary slots e, f, g, and h have been obtained. Accordingly, the decision unit 16 writes "SHARED SECTION TS: e, f, g, and h" for the path #2 in the path switch management table 18. Assume that, for the protection path P2, "INPUT-OUTPUT PORT TS" is configured between the nodes D and Y in advance.

The switch circuit 20 controls traffic of the path #2 in accordance with the contents of the path switch management table 18. In this example, the switch circuit 20 guides the traffic of the path #2 input from an input-output port D to the shared-section-side port. The input-output port D is a physical port accommodating a channel between the nodes Y and D. The shared-section-side port is a physical port accommodating a channel between the nodes Y and X. In this case, the switch circuit 20 extracts received data from tributary slots a-d for received frames and writes the extracted data to tributary slots e-h for transmission frames. Descriptions of the operation for forwarding traffic received from the shared-section side to the node D are omitted.

FIG. 18 illustrates another example of the configuration of a transmission device. In the configuration depicted in FIG. 13, data signals of the data plane and control signals of the control plane are multiplexed and transmitted through the same channel. By contrast, in the configuration depicted in FIG. 18, data signals are transmitted through a channel that is different from a channel through which control signals are transmitted. Accordingly, a transmission device 2 depicted in FIG. 18 includes a transceiver device 21 and an R-APS message add/drop unit 22. Operations of the other circuit elements of the transmission device 2 illustrated in FIG. 18 are substantially the same as those of the transmission device 1 in FIG. 13, and hence descriptions thereof are omitted herein.

Figure 19:
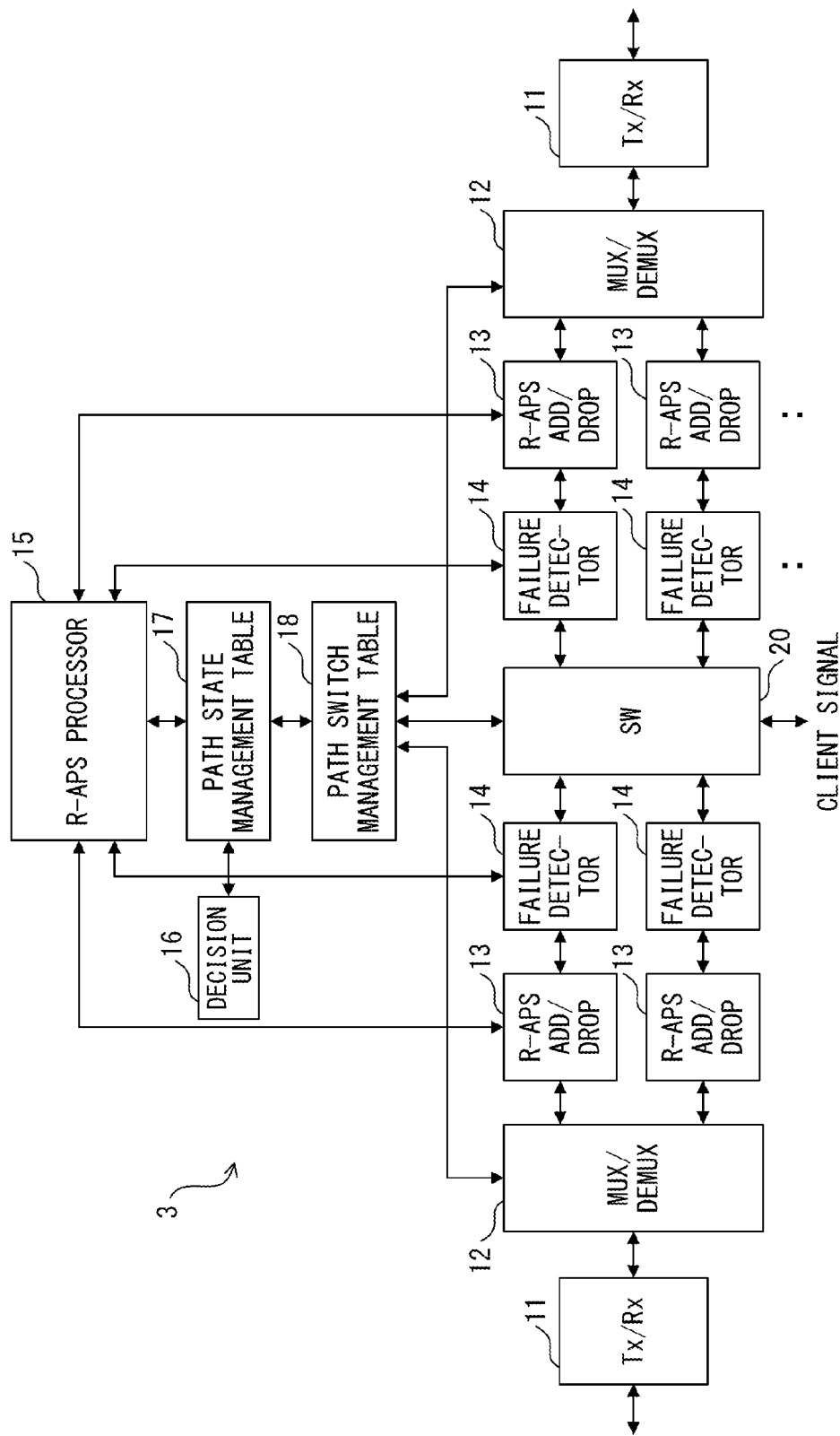
FIG. 19 illustrates still other example of the configuration of a transmission device.

FIG. 19 illustrates still other example of the configuration of a transmission device. Arbitrary nodes can use the transmission devices illustrated in FIGS. 13 and 18. That is, a node accommodating a channel of a shared section may use the transmission devices depicted in FIGS. 13 and 18. By contrast, when a node that does not accommodate a channel of a shared section (e.g., a node that is different from the nodes X and Y) uses either of the transmission devices, the transmission device does not need to include some of the circuit elements depicted in FIG. 13 or 18.

When a node that does not accommodate a channel of a shared section uses a transmission device 3, the transmission device 3 does not need to include the resource manager 19, as illustrated in FIG. 19. The transmission device 3 may accommodate a client channel. As depicted in FIG. 20, for each path, the path switch management table 18 stores "TRANSMISSION RATE", "WORK-SYSTEM INPUT-OUTPUT PORT", "PROTECTION-SYSTEM INPUT-OUTPUT PORT", "STATE", and "SWITCH CONNECTION DIRECTION". The work-system input-output port indicates a port through which data of a work path is input and output, and the protection-system input-output port indicates a port thorough which data of a protection path is input and output. The switch connection direction indicates a port to which a client channel is connected. When a path is in a normal state (corresponding to the idle state in FIG. 16), the switch connection direction indicates a work-system input-output port. When the path is in the protection state, the switch connection direction indicates a protection-system input-output port.

FIG. 20 illustrates the path switch management table 18 of the node device C depicted in FIGS. 9-10. "WORK-SYSTEM INPUT-OUTPUT PORT: D" indicates that the work path W2 is connected to the node D. "PROTECTION-SYSTEM INPUT-OUTPUT PORT: X" indicates that the protection path P2 is connected to the node X. In FIG. 10, since the path #2 is controlled and put in the protection state, the switch connection direction is "X". Hence, data of a client accommodated in the node C is guided to the node X via the protection path P2, and data received from the node X via the protection path P2 is guided to the client accommodated in the node C.

When a relay node is present between the nodes A and B, between the nodes C and D, between the nodes A and X, between the nodes B and Y, between the nodes C and X, or between the nodes D and Y, a transmission device provided at each relay node does not need to perform a process related to R-APS. That is, upon receipt of an R-APS message, the transmission device provided at each relay node forwards the R-APS message to a next node.

FIG. 21 is a flowchart illustrating operations of a transmission device that detects a failure. The processes of the flowchart are performed by, for example, a transmission device provided on a route for which a work path has been configured. In addition, the processes illustrated in FIG. 21 may be realized by executing a program using a computer.

In S1, the failure detector 14 monitors a failure in a monitoring-target work path. In one example, when the frame synchronization of a signal received via the work path is not established, the failure detector 14 decides that a failure has occurred in the work path. Upon detecting a failure, the process moves to S2-S4.

In S2, the R-APS processor 15 and the decision unit 16 specify the path in which a failure has been detected. In the example depicted in FIG. 4, the "path #1" is detected. In S3, the R-APS processor 15 and the decision unit 16 generate an SF message indicating the occurrence of a failure. In this case, a path ID that identifies the path in which a failure has been detected (i.e., the path specified in S2) and information indicating the transmission rate of that path are stored in the R-APS region of the SF message illustrated in FIG. 6. Then, the R-APS processor 15 transmits the generated SF message to a next node via a logical ring formed in a control plane.

In S4, the R-APS processor 15 and the decision unit 16 perform monitoring as to whether the path has recovered from the failure detected in S1. "Recover" does not mean restoring traffic using a corresponding protection path but means removing a failure from a work path. The SF message is periodically transmitted until the path recovers from the failure.

Figure 22:
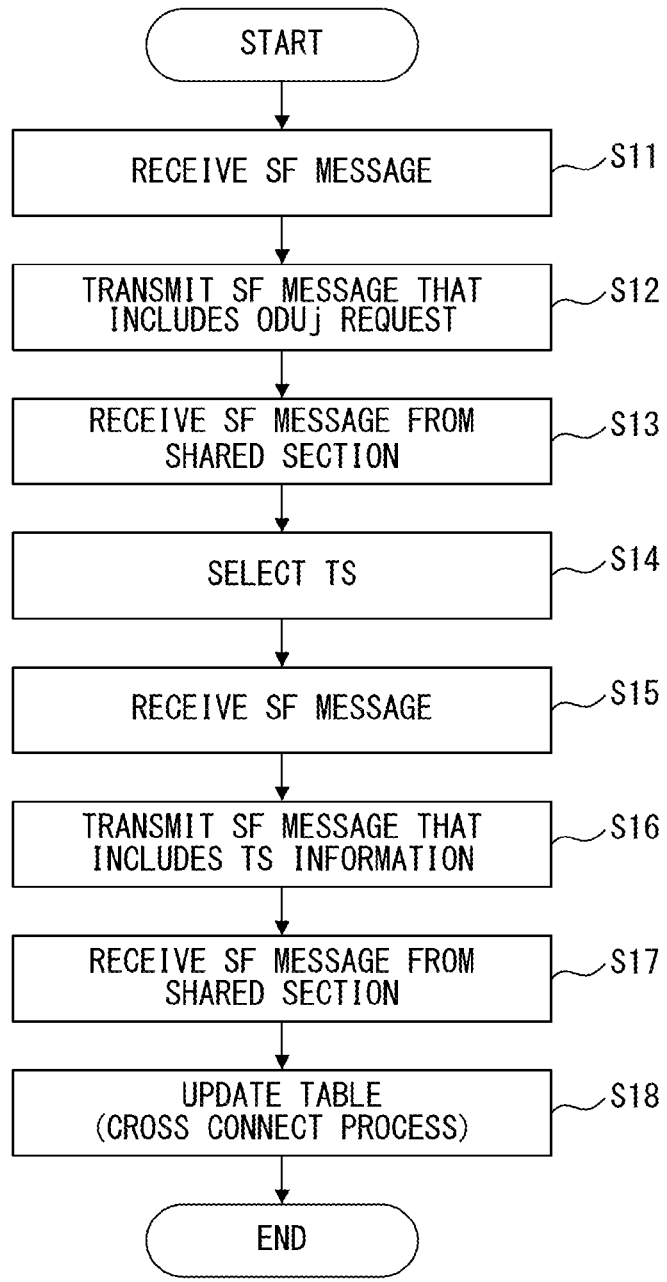
FIG. 22 is a flowchart illustrating operations of a transmission device located at an end of a shared section.

FIG. 22 is a flowchart illustrating operations of a transmission device located at an end of a shared section. Assume that a failure has occurred in a work path corresponding to a protection path configured in the shared section. In addition, the processes illustrated in FIG. 22 may be realized by executing a program using a computer.

In S11, the R-APS processor 15 receives an SF message. As described above with reference to FIG. 21, the SF message includes a path ID that identifies the path in which a failure has been detected and information indicating the transmission rate of that path. In S12, the R-APS processor 15 and the decision unit 16 generate an SF message that includes an ODUj request. The SF message may be generated by assigning the extended TLV depicted in FIG. 6 to the received SF message. The ODUj request requests the transmission rate reported by the received SF message. The SF message that includes the ODUj request is sent to a channel on a shared-section side.

In S13, the R-APS processor 15 receives an SF message from the channel on the shared-section side. The SF message is generated by a transmission device provided at another end of the shared section and includes an ODUj request. In S14, in accordance with the ODUj request stored in the SF message received in S13, the R-APS processor 15 and the decision unit 16 select a tributary slot to be used in the shared section. In this case, the decision unit 16 refers to the resource manager 19.

In S15, the R-APS processor 15 receives a next SF message. In S16, the R-APS processor 15 and the decision unit 16 generate an SF message that includes TS information. The TS information indicates the tributary slot selected in S14. The SF message may be generated by assigning the extended TLV depicted in FIG. 6 to the received SF message. The SF message that includes TS information is sent to the channel on the shared-section side.

In S17, the R-APS processor 15 receives an SF message from the channel on the shared-section side. The SF message is generated by a transmission device provided at another end of the shared section and includes TS information. In S18, in accordance with the TS information stored in the SF message received in S17, the R-APS processor 15 and the decision unit 16 update the path switch management table 18. Subsequently, the switch circuit 20 processes input traffic in accordance with the updated path switch management table 18.

Another Embodiment 1

In the embodiments above, two protection paths are configured in a shared section, and one of the paths is relieved. However, the invention is not limited to this. That is, two or more protection paths may be configured in a shared section, and a plurality of paths may be relieved within the range of the bandwidth of the shared section.

Figure 23:
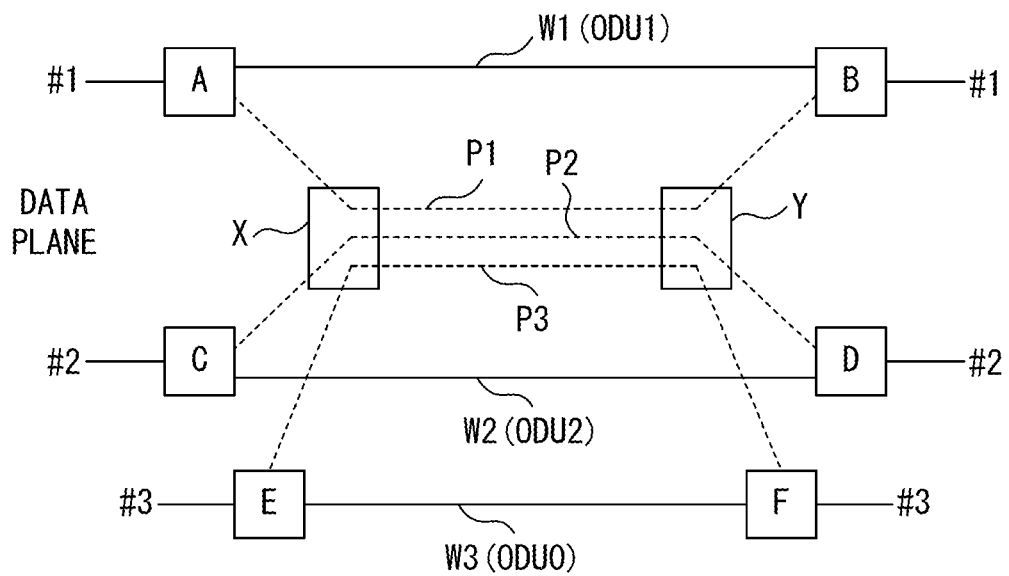
FIG. 23 illustrates the configuration of a network in accordance with another embodiment 1.

In the example depicted in FIG. 23, protection paths P1-P3 corresponding to paths #1-#3 are configured in a shared section X-Y. The transmission rates of the paths #1, #2, and #3 are ODU1 (about 2.5 Gbps), DUD2 (about 10 Gbps), and ODU0 (about 1.25 Gbps), respectively. The shared section X-Y has a bandwidth in which ODU2 can be provided.

Assume that, in a network having the configuration above, failures are detected respectively in the work paths W1 and W3. In this case, the node devices X and Y activate the protection paths P1 and P3 in the shared section. Consequently, the two paths #1 and #3 are relieved. Assume that, subsequently, a failure is also detected in the work path W2, which has the highest priority. In this case, the node devices X and Y release the protection paths P1 and P3 and activate the protection path P2 within the shared section.

Another Embodiment 2

In the embodiments above, one shared section is present for one path, but the invention is not limited to this. In the example illustrated in FIG. 24, protection paths P1 and P2 are configured between the nodes X and Y, and protection paths P1 and P3 are configured between the nodes V and Z. That is, two shared sections are present for the path #1. In this example, the path #3 has the highest priority, the path #1 has the second highest priority, and the path #2 has the lowest priority; the owner nodes of the logical rings #1, #2, and #3 are the node V, the node X, and the node V, respectively.

Assume that, in a network having the configuration above, failures are detected respectively in the work paths W1 and W2. In this case, the protection path P1 is activated between the nodes X and Z. That is, the protection path P1 relieves the path #1. In this case, the path #1 transits to the protection state, and the path #2 transits to the fail state.

Assume that, subsequently, a failure is also detected in the work path W3, i.e., the path having the highest priority. Accordingly, a shared section V-Z is used to provide the protection path P3. In this case, the node device V transmits an FS message via the logical ring #1, and the protection path P1, which has been provided between the nodes X and Z, is released. That is, the path #1 transits to the fail state. In addition, upon receipt of the FS message of the logical ring #1, the node device X transmits an SF message via the logical ring #3. Consequently, the protection path P2 is activated between the nodes X and Y. That is, the protection path P2 relieves the path #2. In this case, the path #2 transits to the protection state.

Another Embodiment 3

Figure 25:
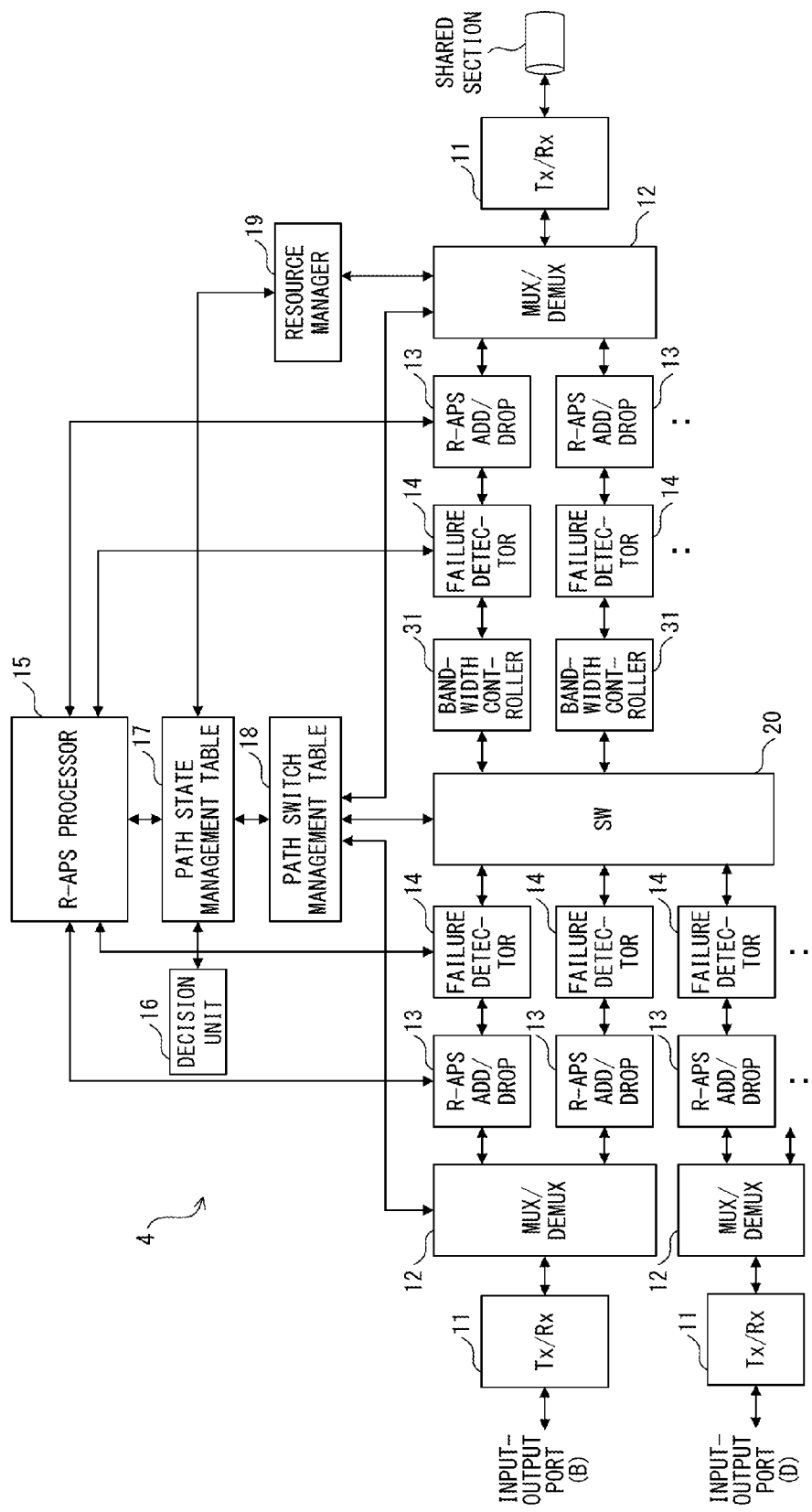
FIG. 25 illustrates the configuration of a transmission device in accordance with another embodiment 3.

The protection path providing method in accordance with each embodiment is not only applicable to a TDM transmission system such as an OTN but is also applicable to, for example, a packet transmission system. That is, the invention is also applicable to, for example, the Ethernet and the MPLS. In this case, a transmission device 4 includes bandwidth controllers 31, as illustrated in FIG. 25. For each path, the bandwidth controller 31 may control the amount of packet transmission (or the interval of packets) in accordance with a designated bandwidth. Alternatively, for each path, the bandwidth controller 31 may discard received packets in accordance with a designated bandwidth. That is, the bandwidth controller 31 is achieved by a shaper or policer.

As in the case of the embodiments above, the bandwidth (corresponding to the transmission rate of the embodiments above) of a path is reported to an necessary node using, for example, an SF message of R-APS. However, extended signaling that includes information requesting a bandwidth, not GMPLS ODU Signaling, may be added to an R-APS message.

<Hardware Configuration of Transmission Device (Node Device)>

Figure 26:
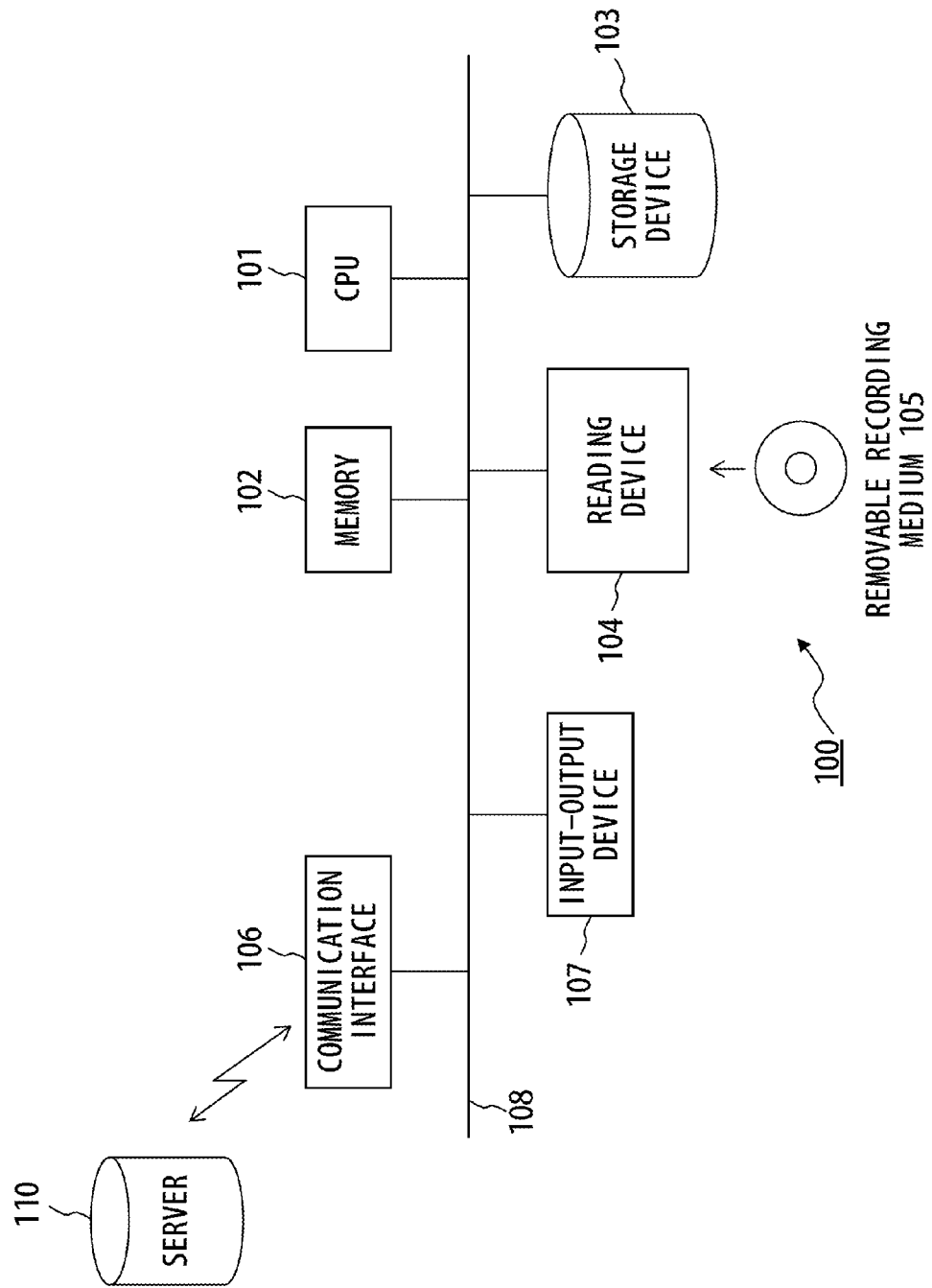
FIG. 26 illustrates an exemplary hardware configuration of a transmission device.

FIG. 26 illustrates an exemplary hardware configuration of a transmission device (or a node device) in accordance with an embodiment. The transmission device includes a computer system 100 depicted in FIG. 26. The computer system 100 includes a CPU 101, a memory 102, a storage device 103, a reading device 104, a communication interface 106, and an input-output device 107. The CPU 101, the memory 102, the storage device 103, the reading device 104, the communication interface 106, and the input-output device 107 are connected to each other by, for example, a bus 108.

The CPU 101 may achieve the protection path providing method by executing a protection path providing program using the memory 102. The memory 102 is, for example, a semiconductor memory, and is configured to include a RAM region and a ROM region. The storage device 103 is, for example, a hard-disk drive, and stores the protection path providing program. The storage device 103 may be a semiconductor memory such as a flash memory. The storage device 103 may be an external recording medium. The path state management table 17 and the path switch management table 18 are stored in the memory 102 or the storage device 103.

The reading device 104 accesses a removable recording medium 105 in accordance with an instruction from the CPU 101. The removable recording medium 105 is achieved by, for example, a semiconductor device (e.g., a USB memory), a medium to which or from which information is magnetically input or output (e.g., a magnetic disk), or a medium to which or from which information is optically input or output (e.g., a CD-ROM or DVD). The communication interface 106 may transmit and receive data over a network in accordance with an instruction from the CPU 101. The input-output device 107 includes, for example, a device that receives an instruction from a user and a device that outputs a processing result of the protection path providing method.

The protection path providing program in accordance with the embodiments is provided to the computer system 100 in, for example, any of the following forms.
(1) Installed in the storage device 103 in advance
(2) Provided by the removable recording medium 105
(3) Provided from a program server 110

<Another Method>

Shared mesh protection may be achieved using RFC 4872 (RSVP-TE Extensions in Support of End-to-End Generalized Multi-Protocol Label Switching (GMPLS) Recovery). However, when a plurality of protection paths configured within a shared section have different transmission rates, dedicated signaling that defines a transmission rate on the shared section needs to be executed to activate a protection path corresponding to a failure. For example, in an OTN network, a Path message cannot be signaled in an end-to-end manner until the settings for HO ODU/LO ODU are completed.

By contrast, in the protection path providing method in accordance with the embodiments, information indicating a transmission rate is added to a message for reporting the occurrence of a failure, and the message is transmitted between nodes so as to achieve path switching. Hence, even when a plurality of protection paths configured in a shared section have different transmission rates, a strict condition on a time of recovery from a failure (e.g., 50 milliseconds or shorter) can be satisfied. That is, according to the embodiments of the invention, it is possible to provide a shared mesh protection in which plural protection paths with different capacities share a channel.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A protection path providing method for use in a network that includes a shared section in which a first protection path corresponding to a first work path to transmit a first traffic and a second protection path corresponding to a second work path to transmit a second traffic are configured, the protection path providing method comprising:

periodically transmitting a message that indicates a state of the network from each transmission device implemented at respective nodes of the network via a logical ring, the logical ring being formed using a route for which the first work path is configured and a route for which the first protection path is configured;

adding information indicating a transmission rate of the first work path to the message and transmitting the message via the logical ring, when a failure is detected in the first work path; and controlling a switch circuit installed in a transmission device provided at an end of the shared section in accordance with the message in such a manner as to transmit the first traffic via the shared section.

2. The protection path providing method according to claim 1, wherein the message includes information for reporting a state of a path configured in the network to a transmission device on the logical ring.

3. The protection path providing method according to claim 1, wherein the message includes information indicating an assignment of communication resources for transmitting the first traffic, and the transmission device provided at the end of the shared section uses the communication resources in accordance with the message so as to transmit the first traffic via the shared section.

4. The protection path providing method according to claim 3, wherein the first work path transmits an OTN frame, the message includes information designating a tributary slot for transmitting the first traffic, and the transmission device provided at the end of the shared section transmits the first traffic via the shared section by using the tributary slot designated by the message.

5. A protection path providing method for use in a network that includes a shared section in which a first protection path corresponding to a first work path to transmit a first traffic and a second protection path corresponding to a second work path to transmit a second traffic are configured, the protection path providing method comprising:

transmitting a message that includes information indicating a transmission rate of the first work path via a logical ring, the logical ring being formed using a route for which the first work path is configured and a route for which the first protection path is configured, when a failure is detected in the first work path; and controlling a switch circuit installed in a transmission device provided at an end of the shared section in accordance with the message in such a manner as to transmit the first traffic via the shared section, wherein a transmission device that detects a failure in the first work path transmits a first message via a first logical ring formed using the route for which the first work path is configured and the route for which the first protection path is configured, the first message including information indicating the transmission rate of the first work path, a transmission device that detects a failure in the second work path transmits a second message via a second logical ring formed using the route for which the second work path is configured and the route for which the second protection path is configured, the second message including information indicating the transmission rate of the second work path, and when the second work path has a higher priority than the first work path, the transmission device provided at the end of the shared section controls the switch circuit in accordance with the second message in such a manner as to transmit the second traffic via the shared section.

6. A protection path providing method for use in a network that includes a shared section in which a first protection path corresponding to a first work path to transmit a first traffic and a second protection path corresponding to a second work path to transmit a second traffic are configured, the protection path providing method comprising:

transmitting a message that includes information indicating a transmission rate of the first work path via a logical ring, the logical ring being formed using a route for which the first work path is configured and a route for which the first protection path is configured, when a failure is detected in the first work path; and controlling a switch circuit installed in a transmission device provided at an end of the shared section in accordance with the message in such a manner as to transmit the first traffic via the shared section, wherein a transmission device that detects a failure in the first work path transmits a first message via a first logical ring formed using the route for which the first work path is configured and the route for which the first protection path is configured, the first message including information indicating the transmission rate of the first work path, a transmission device that detects a failure in the second work path transmits a second message via a second logical ring formed using the route for which the second work path is configured and the route for which the second protection path is configured, the second message including information indicating the transmission rate of the second work path, and the transmission device provided at the end of the shared section controls the switch circuit in accordance with the first and second messages in such a manner as to transmit the first traffic and the second traffic via the shared section.

7. The protection path providing method according to claim 1, wherein the first work path is a packet communication path, and the transmission device provided at the end of the shared section controls an amount of packet transmission or discards a received packet in accordance with the message.

8. A transmission device for use in a network that includes a shared section in which a first protection path corresponding to a first work path to transmit first traffic and a second protection path corresponding to a second work path to transmit second traffic are configured, the transmission device comprising:

a failure detector configured to detect a failure in the first work path;

a message processor configured to periodically transmit a message that indicates a state of the network via a logical ring, the logical ring being formed using a route for which the first work path is configured and a route for which the first protection path is configured;

a switch circuit configured to guide received traffic to a forwarding destination; and a controller configured to control the switch circuit in accordance with a received message, wherein when the failure detector detects the failure in the first work path, the message processor adds information indicating a transmission rate of the first work path to the message and transmits the message via the logical ring, and when the transmission device receives a message that includes information indicating the transmission rate of the first work path from another transmission device, the controller controls the switch circuit in accordance with the received message in such a manner as to transmit the first traffic via the shared section.

* * * * *